(12) United States Patent
Johnson et al.

(10) Patent No.: US 12,283,802 B2
(45) Date of Patent: Apr. 22, 2025

(54) INTEGRATED CABLE TRAY SPLICE

(71) Applicant: Eaton Intelligent Power Limited, Dublin (IE)

(72) Inventors: Jacob L. Johnson, New Baden, IL (US); Harshad N. Keskar, Pune (IN); Joseph V. Vogel, O'Fallon, IL (US); Amol A. Khalkar, Nashik (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 84 days.

(21) Appl. No.: 18/156,486

(22) Filed: Jan. 19, 2023

(65) Prior Publication Data
US 2023/0231367 A1    Jul. 20, 2023

Related U.S. Application Data
(60) Provisional application No. 63/300,879, filed on Jan. 19, 2022.

(51) Int. Cl.
| | |
|---|---|
| *H02G 3/06* | (2006.01) |
| *F16B 5/02* | (2006.01) |
| *F16L 3/26* | (2006.01) |
| *H02G 3/04* | (2006.01) |

(52) U.S. Cl.
CPC .......... *H02G 3/06* (2013.01); *F16B 5/02* (2013.01); *F16L 3/26* (2013.01); *H02G 3/0456* (2013.01)

(58) Field of Classification Search
CPC ...... H02G 3/06; H02G 3/0456; H02G 3/0608; H02G 3/0437; F16B 5/02; F16L 3/26
See application file for complete search history.

(56) References Cited

U.S. PATENT DOCUMENTS
| | | |
|---|---|---|
| 2,834,622 A | 5/1958 | Reeves |
| 2,917,083 A | 12/1959 | Duvall et al. |
| 3,053,358 A | 9/1962 | Gross |
| (Continued) | | |

FOREIGN PATENT DOCUMENTS
| | | |
|---|---|---|
| EP | 2518845 A1 | 10/2012 |
| EP | 3731357 A1 | 10/2020 |
| GB | 2038109 A | 7/1980 |

OTHER PUBLICATIONS
Invitation to Pay Additional Fees w Partial International Search Report issued in PCT/EP2023/25022, dated May 8, 2023, 5 pages.

*Primary Examiner* — Eret C McNichols
(74) *Attorney, Agent, or Firm* — Stinson LLP

(57) ABSTRACT

A cable tray assembly includes first and second cable tray sections. Each cable tray section included a rail including a vertical web, an upper flange, and a lower flange. Each upper flange includes an outboard portion having a downwardly extending tab forming a groove extending along the upper flange. A splice plate assembly connects the first and second cable tray sections. The splice plate assembly includes a first splice plate configured to be retained in the groove extending along the upper flange of the first cable tray section. A second splice plate is configured to be retained in the groove extending along the upper flange of the second cable tray section. The first and second splice plates each define a fastener opening. The fastener openings are alignable with one another and configured to receive a fastener to connect the first and second cable tray sections when the splice plates are attached to the respective cable tray sections.

12 Claims, 36 Drawing Sheets

(56) References Cited

U.S. PATENT DOCUMENTS

| | | | |
|---|---|---|---|
| 3,331,916 A | 7/1967 | George et al. | |
| 3,521,843 A * | 7/1970 | Ogle | F16L 3/26 |
| | | | 248/68.1 |
| 3,636,984 A | 1/1972 | Rauhauser | |
| 4,040,449 A | 8/1977 | Butler et al. | |
| 4,398,564 A | 8/1983 | Young et al. | |
| 4,733,986 A * | 3/1988 | Kenning | H02G 3/0608 |
| | | | 52/848 |
| 4,997,155 A | 3/1991 | Reuter et al. | |
| 4,998,702 A | 3/1991 | Reuter et al. | |
| 5,165,453 A | 11/1992 | Walker, Jr. | |
| 5,391,840 A * | 2/1995 | Hughes | H02G 3/0412 |
| | | | 138/158 |
| 5,449,208 A | 9/1995 | Fox | |
| 5,465,929 A | 11/1995 | Dooley | |
| 5,564,658 A | 10/1996 | Rinderer | |
| 5,628,580 A | 5/1997 | Rinderer | |
| 5,782,439 A | 7/1998 | Rinderer | |
| 5,792,993 A | 8/1998 | Rinderer | |
| 5,816,542 A | 10/1998 | Rinderer | |
| 6,313,405 B1 | 11/2001 | Rinderer | |
| 6,340,141 B1 | 1/2002 | Rinderer | |
| 6,354,542 B1 | 3/2002 | Meyer et al. | |
| 6,523,791 B2 * | 2/2003 | Bernard | H02G 3/0608 |
| | | | 403/387 |
| 6,547,192 B2 | 4/2003 | Rinderer et al. | |
| 6,603,073 B2 | 8/2003 | Ferris | |
| 6,783,104 B1 | 8/2004 | Roth | |
| 7,226,022 B2 * | 6/2007 | Bernard | H02G 3/0608 |
| | | | 403/387 |
| 7,347,031 B2 * | 3/2008 | Callahan | E04G 23/0218 |
| | | | 52/220.8 |
| 7,607,273 B2 * | 10/2009 | Henderson | E04B 1/2403 |
| | | | 403/313 |
| 7,762,042 B2 | 7/2010 | Packard, III | |
| 7,896,295 B2 * | 3/2011 | Beck | G02B 6/4459 |
| | | | 248/68.1 |
| 8,162,267 B2 * | 4/2012 | Waszak | H02G 3/0608 |
| | | | 403/387 |
| 8,178,781 B2 | 5/2012 | Duffy | |
| 8,424,814 B2 | 4/2013 | Davis et al. | |
| 8,459,604 B2 | 6/2013 | Smith et al. | |
| 8,733,723 B2 | 5/2014 | Smith et al. | |
| 8,757,559 B2 | 6/2014 | Davis et al. | |
| 9,209,609 B2 | 12/2015 | Kellerman et al. | |
| 9,350,147 B2 * | 5/2016 | Tally | H02G 3/0608 |
| 9,625,669 B2 | 4/2017 | Tally et al. | |
| 9,841,123 B1 | 12/2017 | White | |
| 9,841,179 B2 * | 12/2017 | Williams | H02G 3/0608 |
| 10,367,340 B2 | 7/2019 | Bae et al. | |
| 10,693,285 B2 | 6/2020 | Jaeker | |
| 10,935,060 B2 * | 3/2021 | Shelton | H02G 3/0608 |
| 11,217,973 B2 * | 1/2022 | Jaeker | F16G 13/16 |
| 11,332,348 B2 * | 5/2022 | Peippo | B66C 6/00 |
| 11,381,065 B2 * | 7/2022 | McAdoo | H02G 1/00 |
| 11,437,793 B2 * | 9/2022 | Johnson | H02G 3/0608 |
| 11,784,474 B2 * | 10/2023 | Khairnar | H02G 3/0608 |
| | | | 248/49 |
| 2002/0158169 A1 * | 10/2002 | Benito-Navazo | H02G 3/0608 |
| | | | 248/49 |
| 2004/0049998 A1 | 3/2004 | Jette | |
| 2010/0086348 A1 * | 4/2010 | Funahashi | H02G 3/0456 |
| | | | 403/306 |
| 2010/0193238 A1 | 8/2010 | Duffy | |
| 2015/0008295 A1 | 1/2015 | Bae et al. | |
| 2016/0006227 A1 | 1/2016 | Tally et al. | |
| 2016/0322798 A1 * | 11/2016 | Tally | H02G 3/0437 |
| 2020/0021092 A1 | 1/2020 | Johnson et al. | |
| 2022/0060007 A1 | 2/2022 | Khairnar et al. | |

\* cited by examiner

INTEGRATED CABLE TRAY SPLICE

CROSS-REFERENCE TO RELATED APPLICATION

This application claims the benefit of U.S. Provisional Application No. 63/300,879, filed Jan. 19, 2022, the entirety of which is hereby incorporated by reference.

FIELD

The present disclosure relates to cable tray splices to splice two cable tray sections together.

BACKGROUND

Ladder-type cable trays are used by the industry to support electrical cable, for example. A length or section of the ladder cable tray comprises a pair of side rails connected by cable-supporting rungs extending between the rails at intervals along the tray. Cable tray sections and fittings are spliced together using splice plates to form a cable tray assembly.

SUMMARY

In one aspect, a cable tray assembly generally comprises first and second cable tray sections. Each cable tray section comprises a rail including a vertical web, an upper flange, and a lower flange. Each upper flange includes an outboard portion having a downwardly extending tab forming a groove extending along the upper flange. A splice plate assembly connects the first and second cable tray sections. The splice plate assembly comprises a first splice plate configured to be retained in the groove extending along the upper flange of the first cable tray section. A second splice plate is configured to be retained in the groove extending along the upper flange of the second cable tray section. The first and second splice plates each define a fastener opening. The fastener openings are alignable with one another and configured to receive a fastener to connect the first and second cable tray sections when the splice plates are attached to the respective cable tray sections.

In another aspect, a cable tray assembly generally comprises first and second cable tray sections. Each cable tray section comprises a rail including a vertical web, an upper flange, and a lower flange. Each upper flange includes an outboard portion having a downwardly extending tab forming a groove extending along the upper flange. A splice plate assembly is configured for connecting the first and second cable tray sections. The splice plate assembly comprises a plate body configured to span a portion of the first and second cable tray sections and configured to secure the splice plate assembly to the first and second cable tray sections.

In yet another aspect, a cable tray assembly generally comprises first and second cable tray sections. Each cable tray section comprises a rail including a vertical web, an upper flange, and a lower flange. A splice plate assembly is configured for connecting the first and second cable tray sections. The splice plate assembly comprises a first splice plate including a first portion attachable directly to the first cable tray section and a second portion extending longitudinally past an edge of the first cable tray section toward the second cable tray section. A second splice plate includes a first portion attachable directly to the second cable tray section and a second portion extending longitudinally past an edge of the second cable tray section toward the first cable tray section. The second portion of the first splice plate mates with the second portion of the second splice plate when the first and second splice plates are coupled together to attach the first and second cable tray sections together.

Other objects and features will be in part apparent and in part pointed out hereinafter.

DESCRIPTION OF THE DRAWINGS

Corresponding reference characters indicate corresponding parts throughout the drawings.

DETAILED DESCRIPTION

Figure 1:
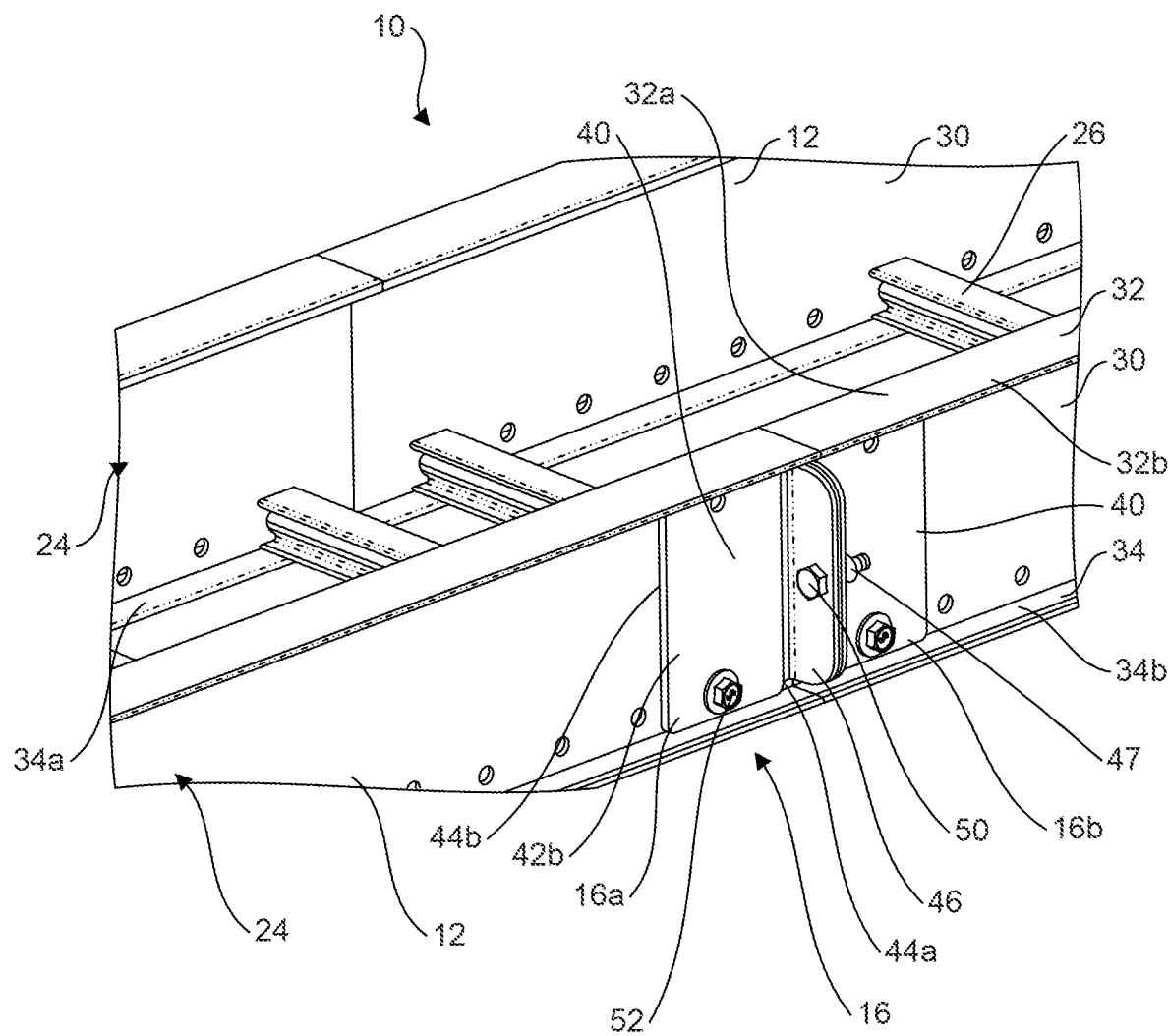
FIG. 1 is a perspective view of an embodiment of the splice plate of the present disclosure in an installed position on a cable tray.
Figure 2:
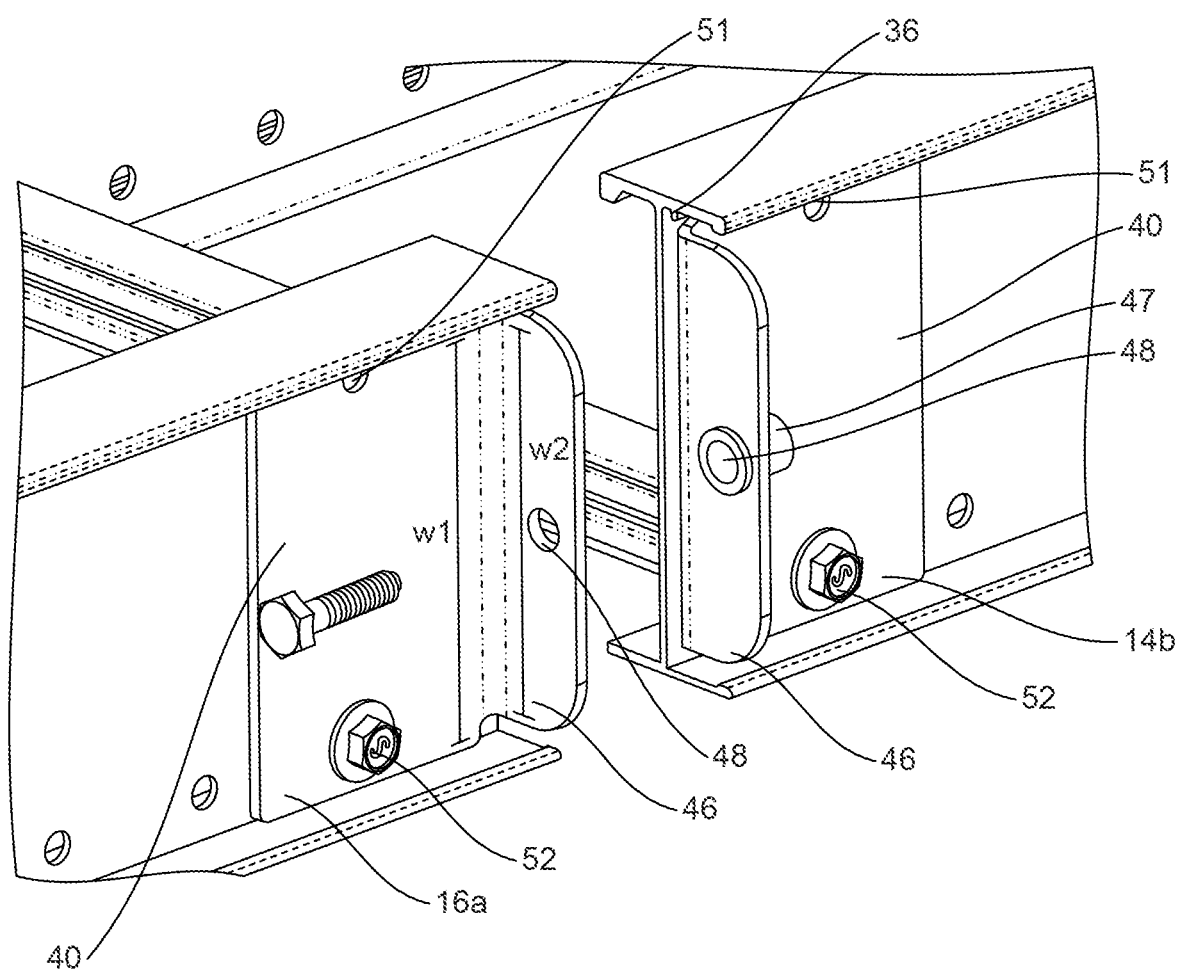
FIG. 2 is a perspective view of the splice plate of FIG. 1 with the cable tray sections separated.
Figure 3:
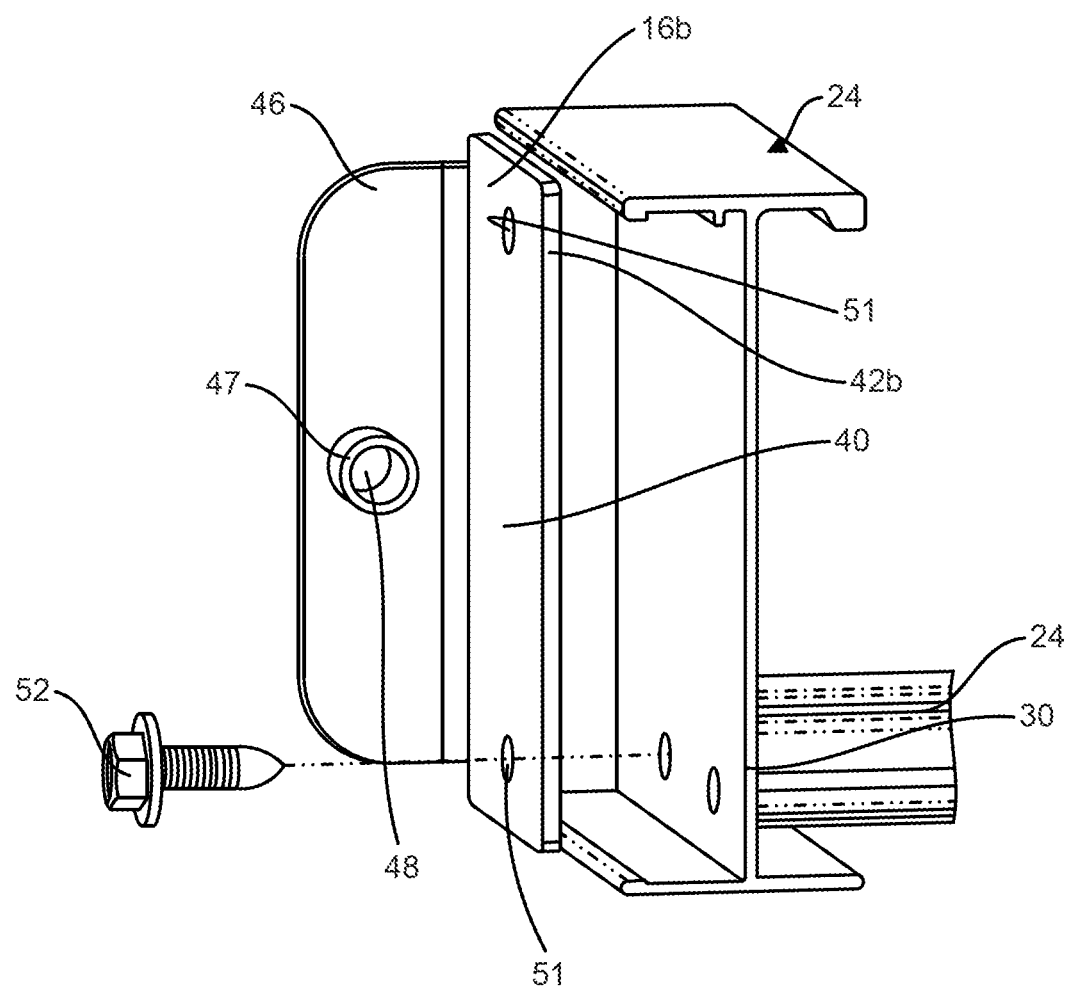
FIG. 3 is an exploded perspective view of one of the splice plate sections and one of the cable tray sections of FIG. 1.
Figure 4A:
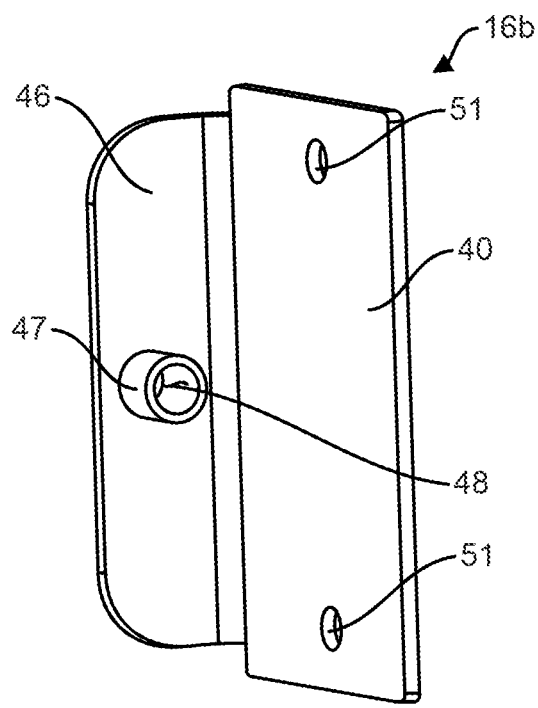
FIG. 4A is a perspective view of one of the splice plate sections of the splice plate of FIG. 1.
Figure 4B:
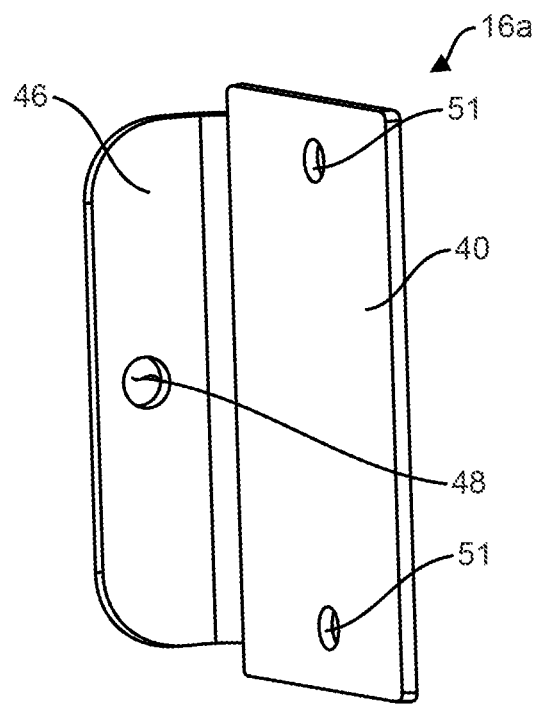
FIG. 4B is a perspective view of the other of the splice plate sections of the splice plate of FIG. 1.

Referring now to the drawings, and in particular to FIGS. 1 and 2, a cable tray assembly constructed according to the teachings of the present disclosure is generally indicated at reference numeral 10. The cable tray assembly includes cable tray sections, each generally indicated at 12, and a splice plate assembly 16 formed from splice plates 16a, 16b connecting the cable tray sections together. As used herein, terms denoting relative locations and positions of components and structures, including but not limited to "upper," "lower," "left," "right," "front," and "rear" are in reference to the cable tray assembly 10 in the horizontal orientation, as shown in FIG. 1. It is understood that these terms are for ease of description and not meant in a limiting sense. It is understood that the cable tray assembly 10 may be in a vertical orientation in the field, whereby the relative locations and positions of the components and structures would be different than as shown in the drawings. As used herein, the term "inboard" means toward or in the interior of the cable tray section 12 and/or cable tray assembly 10. As used herein, the term "outboard" means away from the interior or at the exterior of the cable tray section 12 and/or cable tray assembly 10.

The cable tray section 12 includes two parallel rails, generally indicated at, 24, (e.g., straight rails) forming the sides of the cable tray section, and a plurality of cable-supporting rungs 26 extending between the rails 24 at intervals spaced lengthwise of the section. Each rail 24 has a generally I-shaped cross section or profile, broadly a first cross-sectional shape (e.g., general I-shaped beam). Each rail 24 may have other cross sectional shapes. Each rail 24 comprises a generally vertical web 30, an upper generally horizontal flange 32 at the upper end of the web having inboard and outboard portions 32a, 32b, and a lower generally horizontal flange 34 at the lower end of the web having inboard and outboard portions 34a, 34b. The rungs 26 are secured (e.g., by welding) to the inboard portions 34a of the lower flanges 34. The outboard portion of the upper flange 32b can, in some embodiments, include an icicle groove 36 (broadly, a groove) formed from a downwardly extending tab. The length of each manufactured cable tray section 12 may also vary (e.g., from 10 to 30 feet). Sections 12 may be cut in the field to varying lengths.

Referring to FIGS. 1 to 4B, the splice plate assembly 16 generally comprises a first splice plate 16a and a second splice plate 16b. Each of the first and second splice plates 16a, 16b include a generally planar plate body 40 with an inboard face 42a and an outboard face 42b. The plate body 40 has a first end portion 44a and a second end portion 44b. The first end 44a terminates in a generally planar lip 46 that is generally transverse to the longitudinal axis of the plate body 40. The connecting edge or corner between the lip 46 and the first end 44a is rounded in the illustrated embodiment, although a non-rounded corner is also envisioned. Likewise, the outer corners of the generally planar lip 46 can have rounded corners. Width W1 of the plate body 40 extending between upper and lower sides thereof is typically greater than a width W2 of the lip (FIG. 2). The lip 46 can extend outboard of the rail 24 such that it passes the outer perimeter of the upper and lower flanges 32, 34. The lip 46 of both the first and second splice plate sections 16a, 16b define a fastener opening 48 thereon configured to receive a bolt or other fastener. In the illustrated embodiment, the first splice plate 16a defines a standard opening 48, whereas the second splice plate section 16b has a threaded sleeve 47 coupled to the fastener opening 48. In this way, a threaded fastener 50 can be inserted through opening 48 and threaded into the threaded sleeve 47 such that no nut is needed. Alternatively, both the first and second splice plates 16a, 16b define a fastener opening without a sleeve. In order to secure a fastener therethrough, a nut or other appropriate mechanism can be used in conjunction with the fastener.

The plate body 40 defines at least one opening 51 (for example, two openings) in a center portion between the first end portion 44a and the second end portion 44b. In the illustrated embodiment, the plate body 40 defines two openings 51 at an upper and lower portion thereof. When installed on the cable tray rail, the openings 51 typically correspond with openings in the vertical web 30. Typically, a fastener 52 (e.g., a bolt) is received through at least one of the openings 51 to secure the first or second splice plates 16a, 16b to a cable tray section 12. In preferred embodiments, a fastener 52 is received only through the lower opening 51. An additional, unused upper opening 51 is also present in order to provide symmetry through a horizontal plane of the first and second splice plates 16a, 16b. In this way, the first and second splice plates 16a, 16b can be used in any necessary configuration.

Thus, in use, the upper edge of the plate body 40 of the first splice plate section 16a is received within the icicle groove 36 of a first cable tray section 12 to secure the upper edge to the cable tray rail 26. The lower edge of the plate body 40 is secured to the vertical web 30 by a fastener 52 inserted through a bottom opening 51 defined in the plate body 40. Similarly, the upper edge of the plate body 40 of the second splice plate section 12b is received within the icicle groove 36 of a second cable tray section 12, and a fastener is inserted through a bottom opening 51 defined by the plate body 40. As shown in the figures, the first and second splice plates 16a, 16b are typically installed at the end portion of the rail 26 such that a vertical plane of the lip 46 is at or near the termination of the rail 26. In order to have the outer faces of the lips 46 of the first and second splice plate sections 16a, 16b coupled to each other, one of the splice plates 16a, 16b is rotated around the horizontal longitudinal plane of the splice plate 16a, 16b such that the two plates mirror each other. In this way, the two cable tray sections 12 can be slid toward each other such that the outer faces of the lips 46 of the first and second splice plates 16a, 16b lie generally flat against one another with their fastener openings 48 aligned and a fastener 50 can be securely inserted therethrough.

Referring now to FIGS. 5 to 8, a further embodiment of a splice plate assembly is generally indicated at reference numeral 116 having a first and second splice plate 116a, 116b. Each splice plate 116a, 116b defines fastener openings 146 that are alignable with each other and that receive fasteners 150 therethrough to join adjacent cable tray sections 112 together. In the illustrated embodiment, the fastener 150 is received within and secured by a nut 147.

The first and second splice plates 116a, 116b are generally identical and include a body configured to be attached to a cable tray rail. The upper portion of the body generally includes parallel first and third walls 118, 122 are connected to one another by a second wall 120. The second wall 120 extends generally perpendicularly to the first and third walls 118, 122 and joins the first and third walls 118, 122 at outboard ends thereof. Similarly, the lower portion of the body generally includes parallel fourth and sixth walls 130, 134 that are connected to one another by a fifth wall 132. The fifth wall 132 extends generally perpendicularly to the fourth and sixth walls 130, 134 and joins the fourth and sixth walls 130, 134 at outboard ends thereof.

The inboard end of the first wall 118 includes an upwardly extending upper tab 138 that is generally perpendicular to the first wall 118. Similarly, the inboard end of the fourth wall 130 includes a downwardly extending lower tab 140 that is generally perpendicular to the fourth wall 130. The inboard portion of the third wall 122 includes an angled, downwardly extending seventh wall 144, and the inboard portion of the sixth wall 134 includes an angled, upwardly extending eighth wall 148. Both the seventh and eighth walls 144, 148 extend toward and couple to a fastener portion 150 of the splice plates 116a, 116b.

The fastener opening 146 is defined, at least partially, by a fastener wall 153. The outboard section of the fastener opening 146 includes a slot 154. The axis of the opening 146 extends along the rail 124 when the splice member is attached to the rail. In the illustrated embodiment, the fastener opening 146 has a rectangular or square-shaped cross section. Other embodiments may include fastener openings having different cross-sectional shapes. The fastener walls can have a varying thickness with a convex (e.g., curved or circular) exterior surface (relative to the opening 146). As a result, the fastener walls 153 (specifically, the front or rear edge margins of the walls) generally form a generally circular seat 160 on the front and rear sides of the splice plates 116a, 116b. Each seat 160 is sized and shaped to correspond to the size and shape of a head of a fastener 150 and nut 147. The seat 160 is engaged by either the head of the fastener or the nut 147 when the fastener and nut are used to secure adjacent cable tray sections 112 together via the splice plate assembly 116. As a result of the circular seat 160, forces applied by the head of the fastener 150 and nut 147 are spread out over a greater surface area, and the seat generally covers edges of the head of the fastener and the nut.

Extending inboard from the fastener opening and generally parallel to the first and fourth walls 118, 131 is a stability tab 164 having a length configured to contact the vertical web 130 of the rail 124 in order to provide improved stability when the splice plate is installed on a cable tray section.

Figure 5:
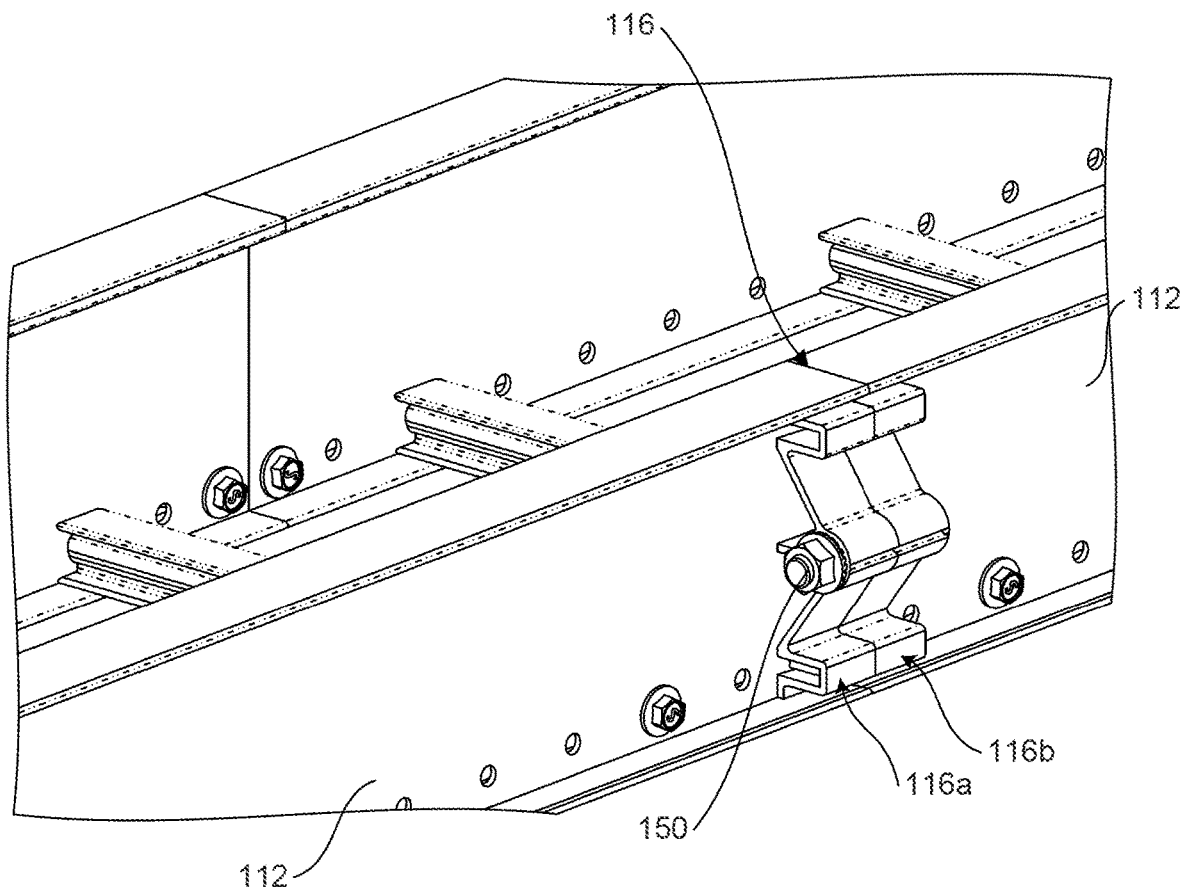
FIG. 5 is a perspective view of another embodiment of the splice plate of the present disclosure in an installed position on a cable tray.
Figure 6:
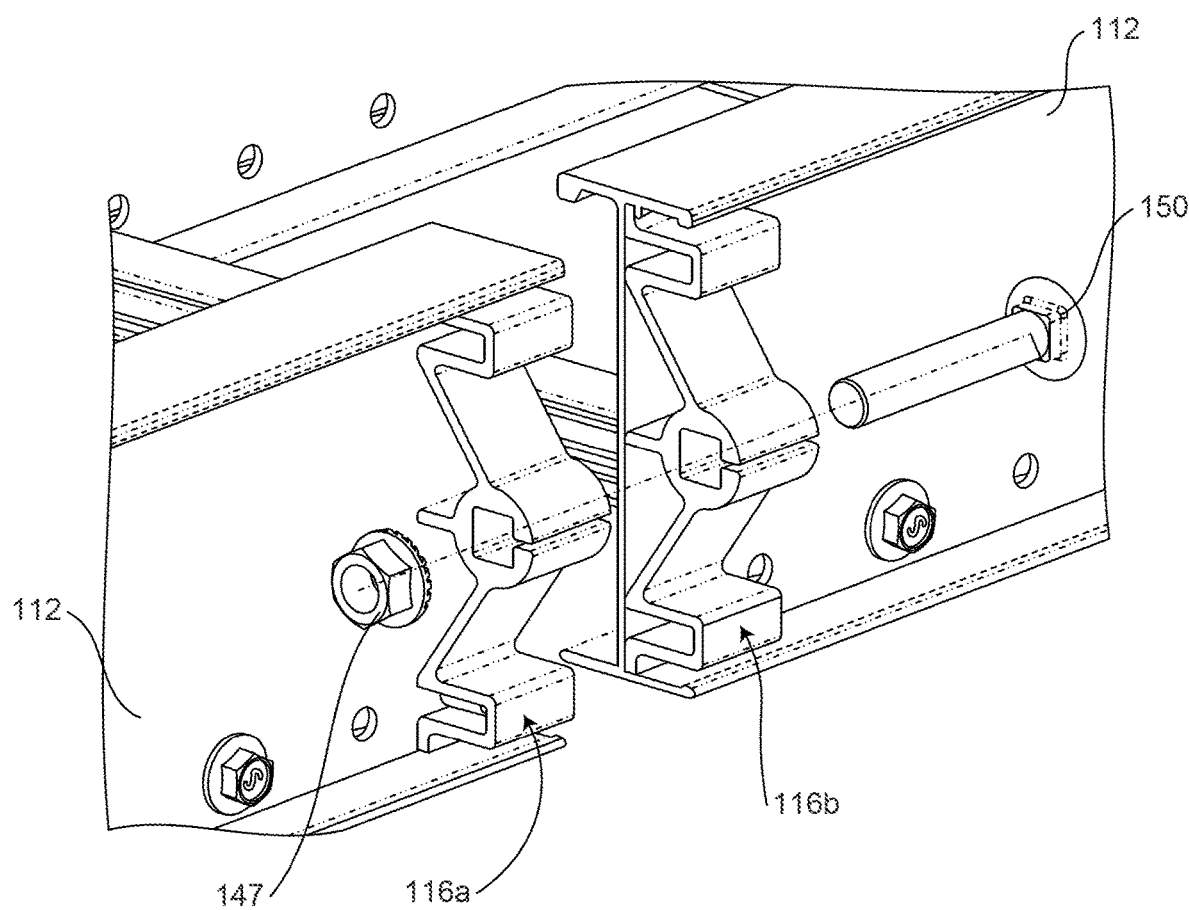
FIG. 6 is a perspective view of the splice plate of FIG. 5 with the cable tray sections separated.
Figure 7:
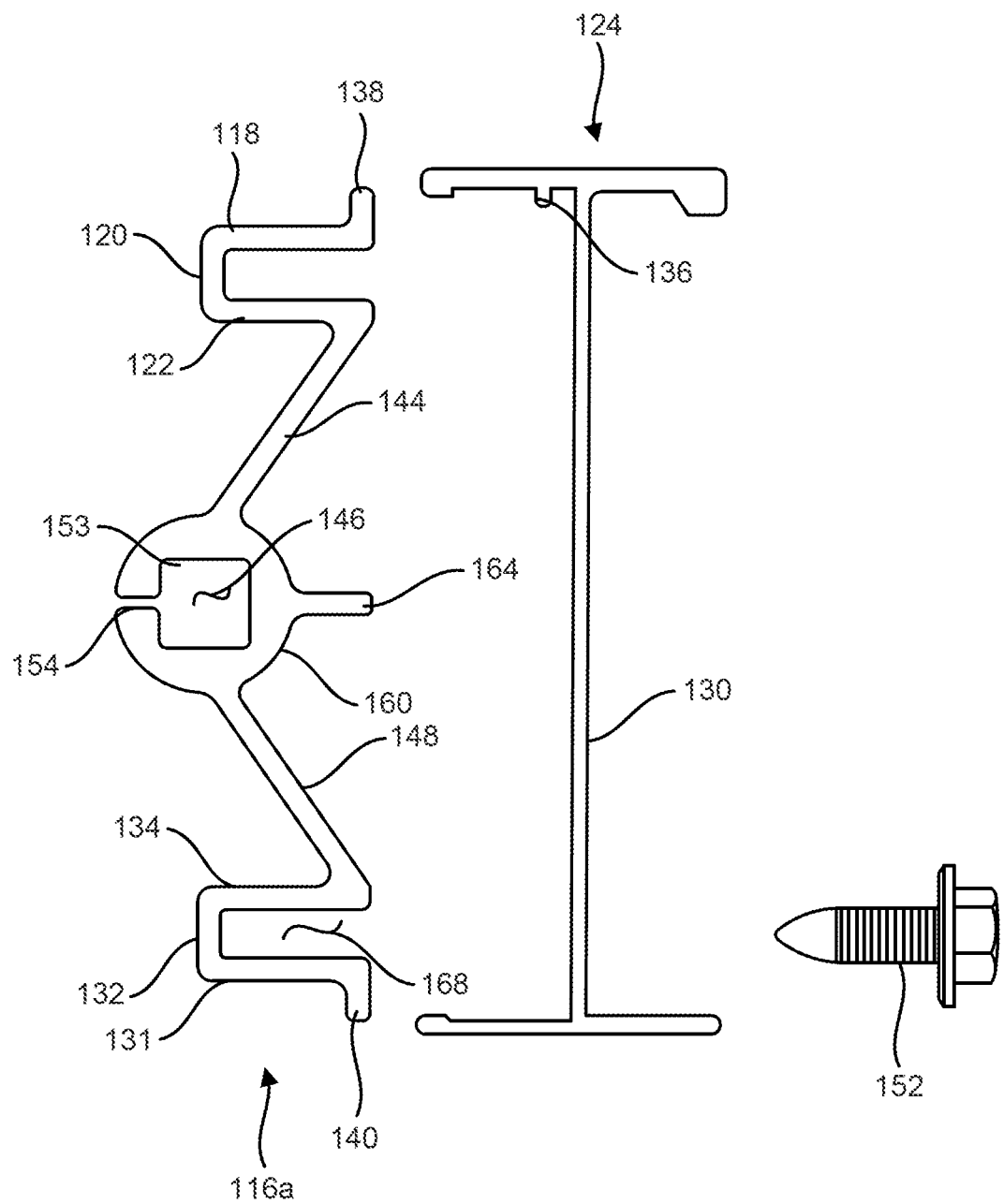
FIG. 7 is an exploded side view of one of the splice plate sections and cable tray sections of the splice plate of FIG. 5.
Figure 8:
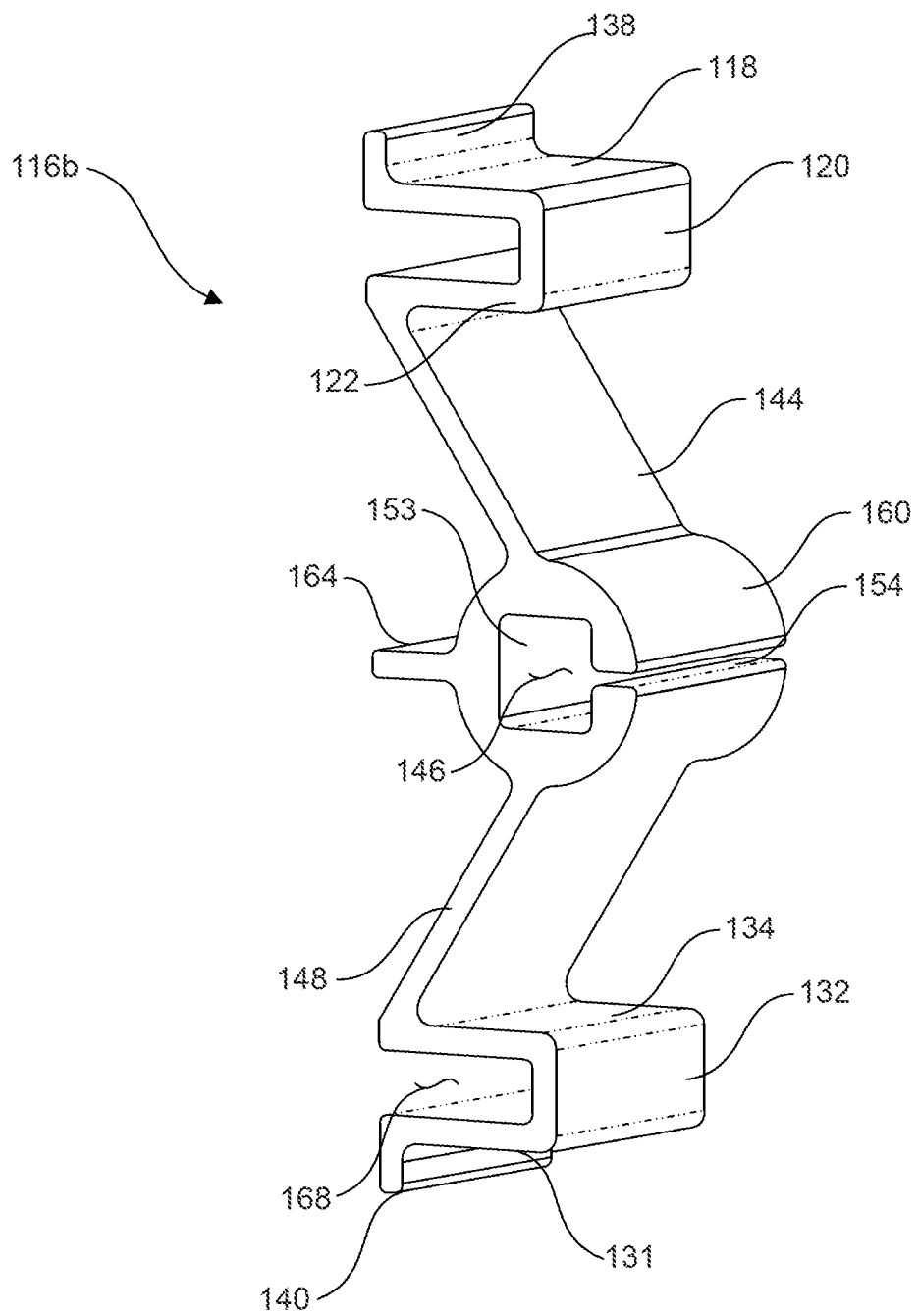
FIG. 8 is a perspective view of one of the splice plate sections of the splice plate of FIG. 5.
Figure 9:
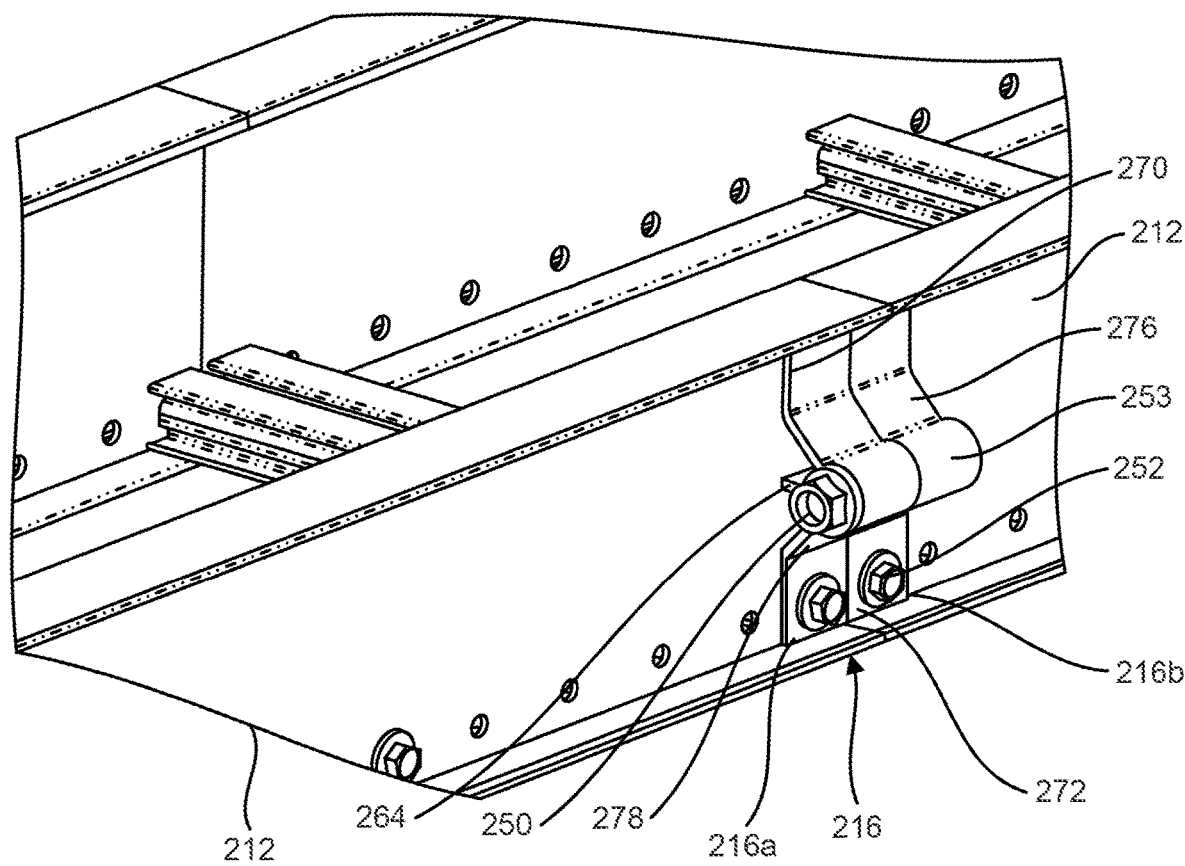
FIG. 9 is a perspective view of another embodiment of the splice plate of the present disclosure in an installed positioned on a cable tray.
Figure 10:
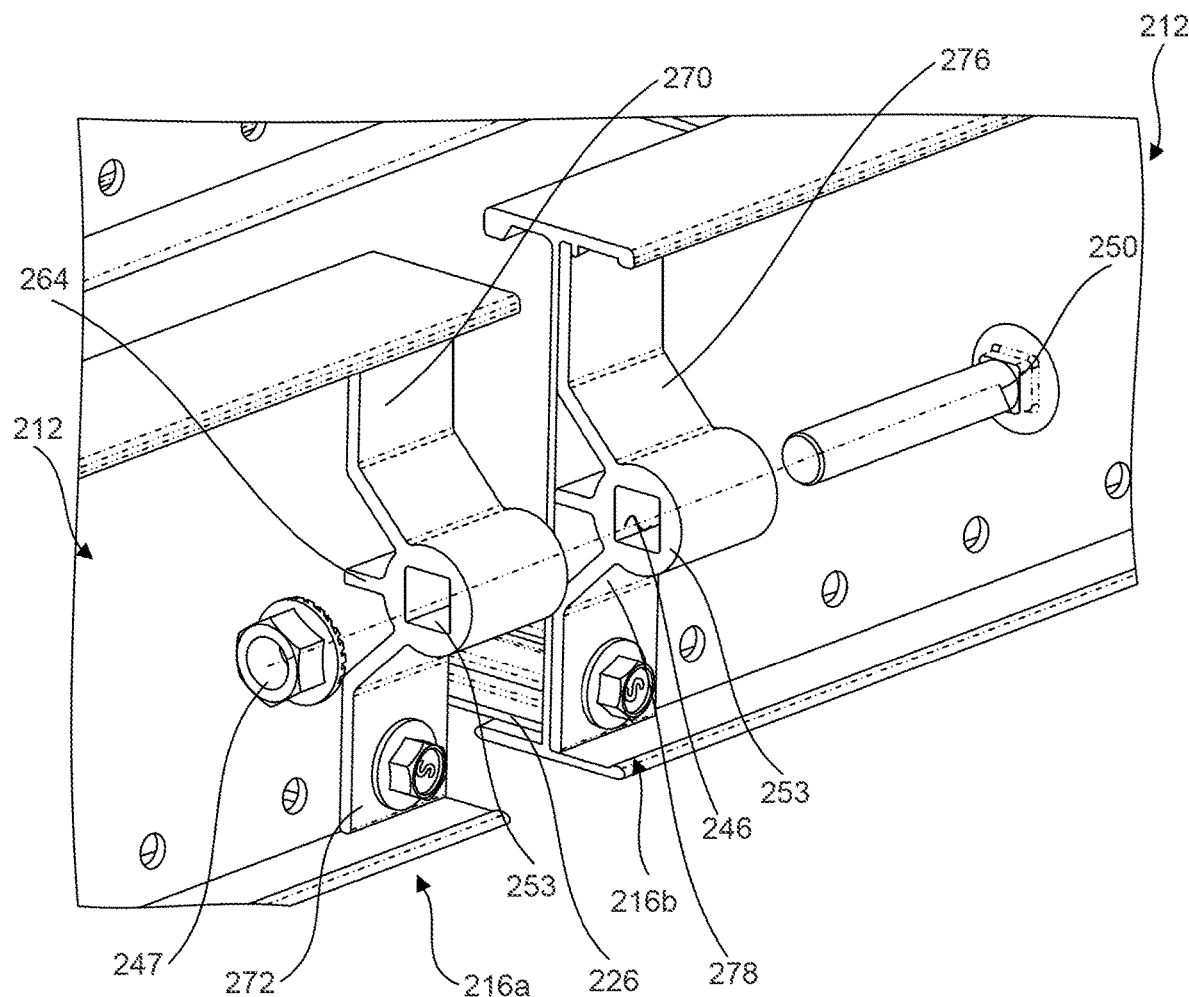
FIG. 10 is a perspective view of the splice plate of FIG. 9 with the cable tray sections separated.
Figure 12:
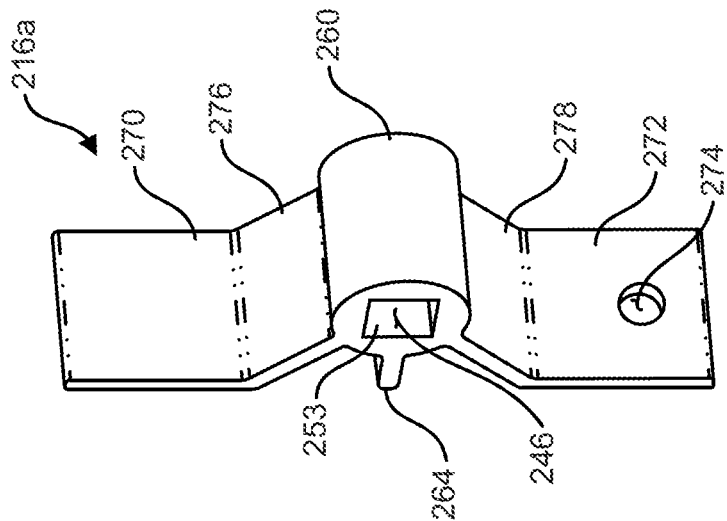
FIG. 12 is a perspective view of one of the splice plate sections of the splice plate of FIG. 9.
Figure 11:
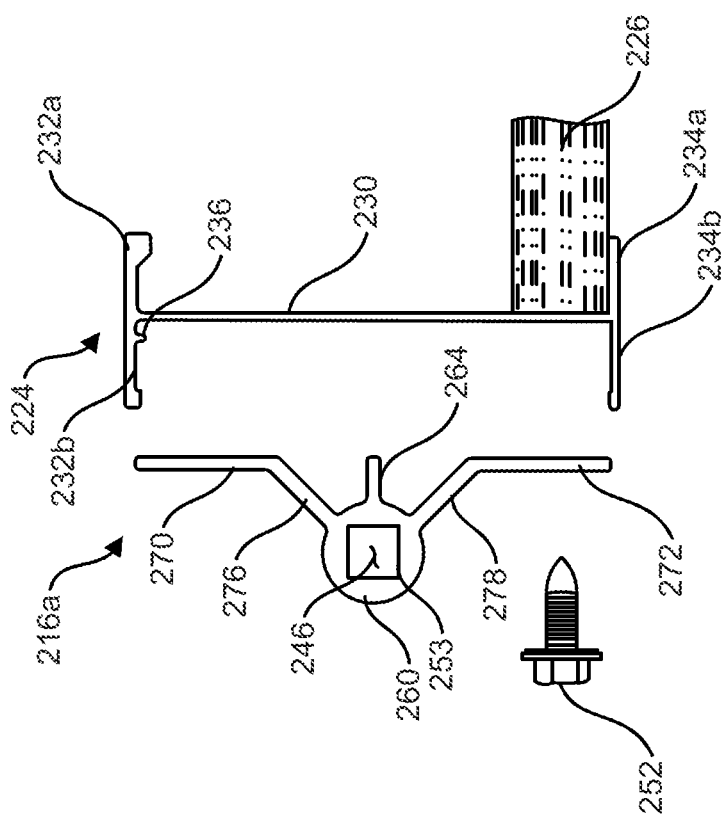
FIG. 11 is an exploded side view of one of the splice plate sections and cable tray sections of the splice plate of FIG. 9.

As shown in FIGS. 5 and 6, when the splice plates 116a, 116b are attached to a rail 124, the front plane of the splice member is generally aligned with the longitudinal end of the rail. The other splice member section's rear plane is aligned with the longitudinal end of the adjacent rail.

In use, the upper tab 138 of the first splice plate 116a is received within the icicle groove 136 of a first cable tray section 112 to secure the upper edge to the cable tray rail 126. The lower portion of the body is secured to the vertical web 130 by a fastener 152 inserted into the inboard slot 168 formed from the space between the fourth and sixth walls 131, 134. In this way, the fastener 152 is inserted into slot 168 and pierces the fifth wall 132. Similarly, the upper tab of the second splice plate section 116b is received within the icicle groove 136 of a second cable tray section 112. The lower portion of the body is secured to the vertical web 130 by a fastener 152 inserted into the inboard slot 168 formed from the space between the fourth and sixth walls 130, 134. The fastener is inserted into slot 168 and pierces the fifth wall 132.

As shown in the figures, the first and second splice plates 116a, 116b are typically installed at the end portion of the rail 126 such that a front edge margin of one splice plate 116a is aligned with a front longitudinal end of the rail, and the rear edge margin of the other splice plate 116b is aligned with a rear longitudinal end of the adjacent rail. In this way, the two cable tray sections 112 can be slid toward each other such that the front and rear edge margins of the first and second splice plates 116a, 116b, respectively, lie generally flat against one another with their fastener openings 146 aligned and a fastener 150 can be securely inserted therethrough.

Turning now to FIGS. 9 to 12, another embodiment of the splice plate assembly of the present disclosure is generally indicated by reference numeral 216. The splice plate assembly 216 is similar to splice plate assembly 116, and all corresponding parts are indicated by the same reference plus 100. In contrast to splice plate assembly 116, splice plates 216a, 216b include an upper and a lower vertical wall 270, 272. The lower vertical wall 272 defines a fastener opening 274 on a lower portion thereof. The fastener opening 274 generally aligns with an opening defined in the vertical web 230. A fastener 250 secured by a nut 247 can be inserted through the fastener opening 274 to secure the splice plates 216a, 216b to the rail. In other embodiments, the fastener is inserted through the fastener opening 274 and into a cable tray rung 226 such that no nut is needed.

The lower end of the upper wall terminates in a downwardly angled central wall 276 leading to the fastener wall 253. The upper end of the lower wall terminates in an upwardly angled central wall 278 leading to the fastener wall 253. Extending inboard from the fastener opening 246 and generally perpendicular to the upper and lower vertical walls 270, 272 is a stability tab 264 having a length configured to contact the vertical web 230 of the rail 224 in order to provide improved stability when the splice plate assembly 216 is installed on the cable tray section 212.

Thus, in use, the upper end of the upper vertical wall of the first splice plate 216a is received within the icicle groove 236 of a first cable tray section 212 to secure the upper edge to the cable tray rail 226. The lower edge of the plate body is secured to the vertical web 230 by a fastener 252 inserted through the bottom fastener opening, particularly when the bottom fastener opening is aligned with an opening defined by the vertical web 230. Similarly, the upper end of the vertical wall of the second splice plate 216b is received within the icicle groove 236 of a second cable tray section 212, and a fastener is inserted through the bottom fastener opening 274, particularly when the bottom fastener opening is aligned with an opening defined by the vertical web 230.

As shown in the figures, the first and second splice plates 216a, 216b are typically installed at the end portion of the rail 226 such that a front edge margin of one splice plate 216a is aligned with a front longitudinal end of the rail, and the rear edge margin of the other splice plate 216b is aligned with a rear longitudinal end of the adjacent rail. In this way, the two cable tray sections 212 can be slid toward each other such that the front and rear edge margins of the first and second splice plates 216a, 216b, respectively, lie generally flat against one another with their fastener openings 246 aligned and a fastener 250 can be securely inserted therethrough.

Figure 13A:
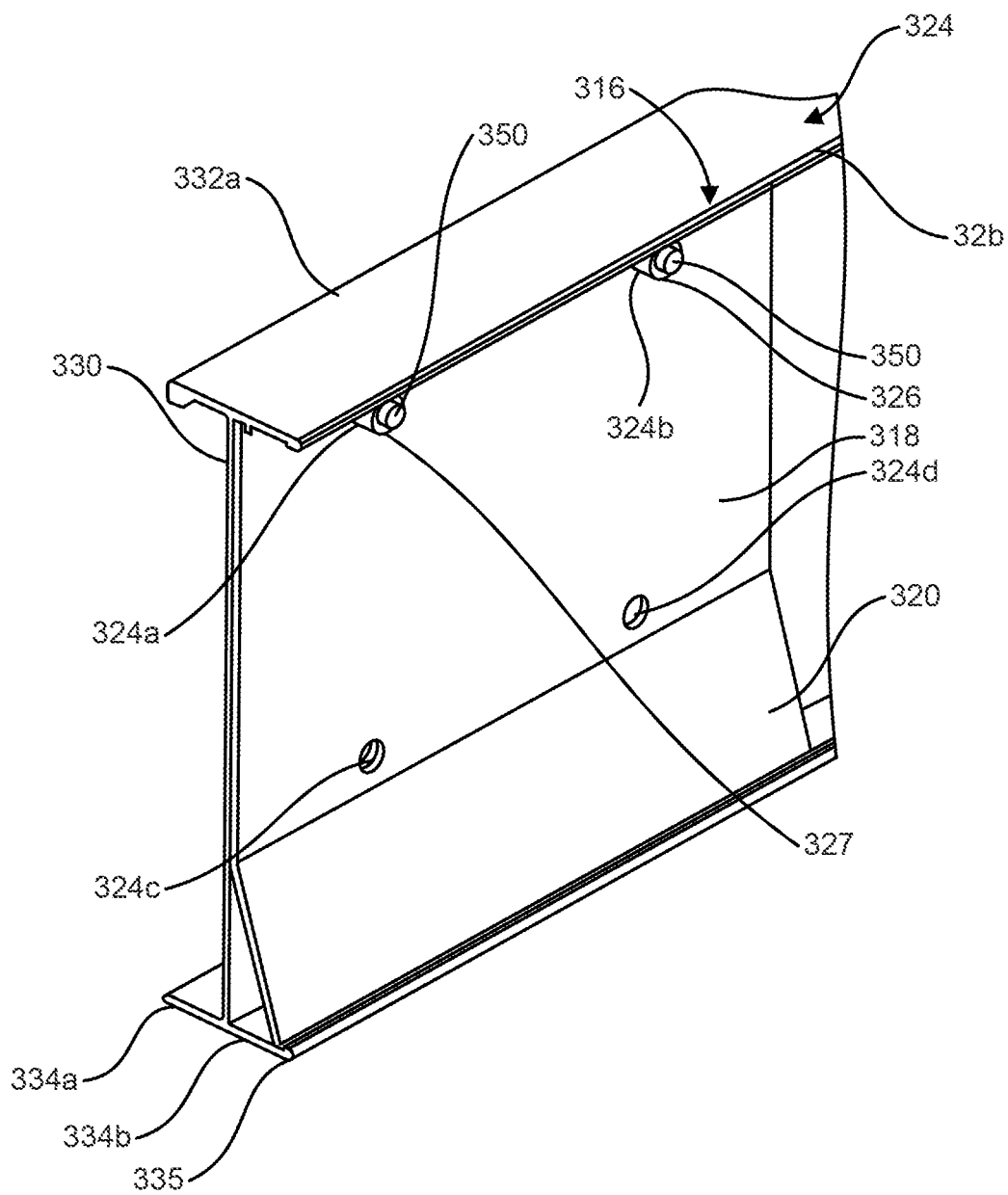
FIG. 13A is a perspective view of another embodiment of a splice plate on one cable tray section.
Figure 13B:
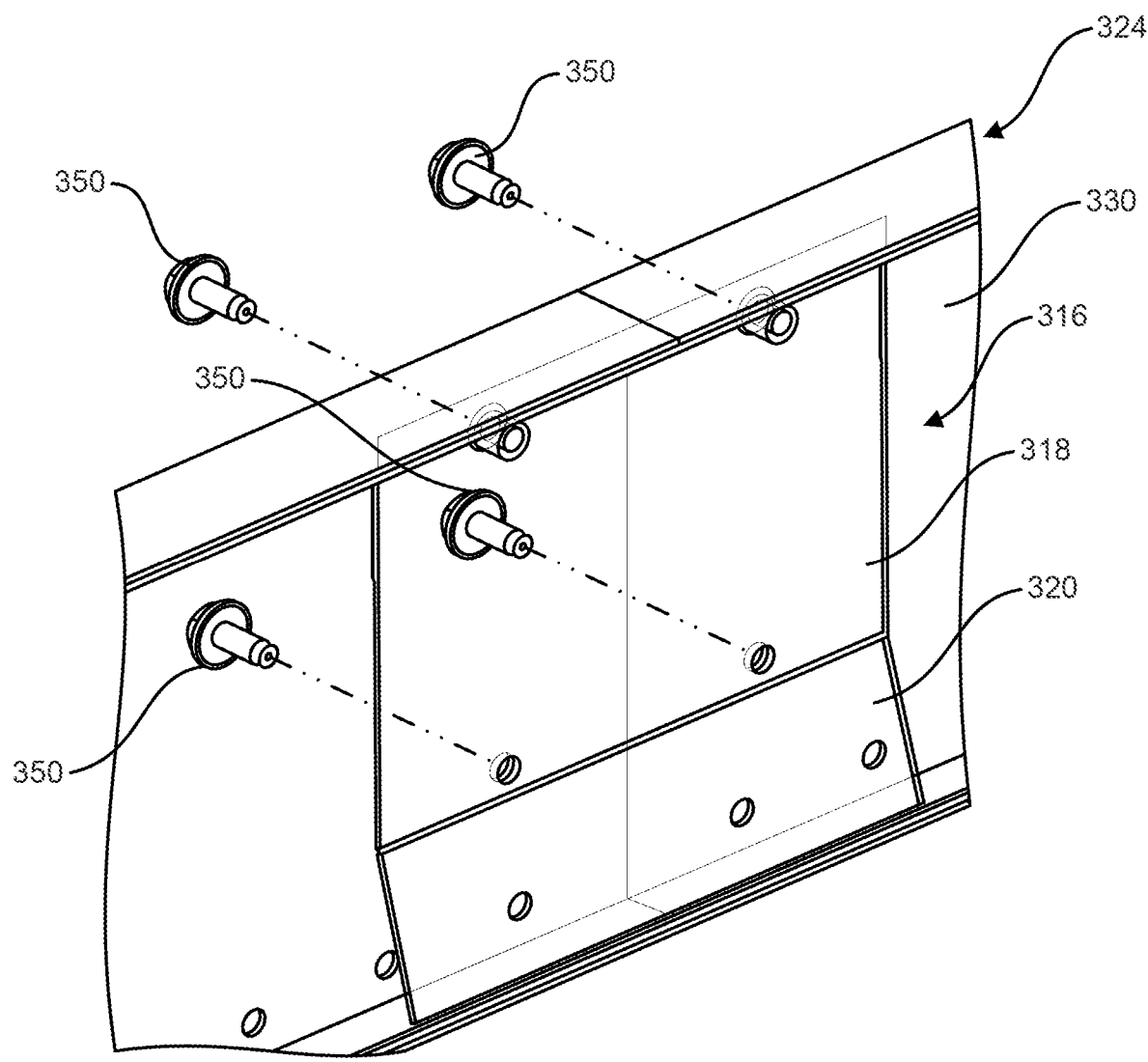
FIG. 13B is a perspective view of the splice plate of FIG. 13A connecting two cable tray sections together.
Figure 14:
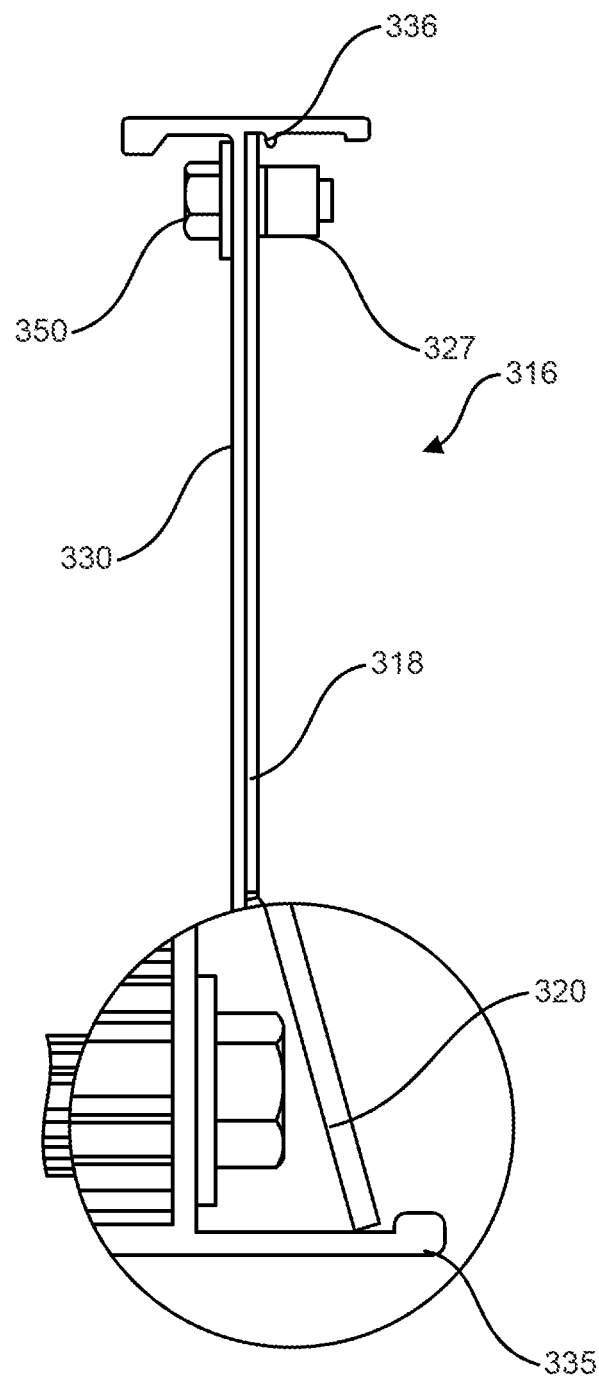
FIG. 14 is a side plan view of the splice plate of FIG. 13A with an enlarged view showing the angled portion retained by the toe and lack of fastener interference.

Turning now to FIGS. 13A, 13B and 14, a further embodiment of the splice plate assembly of the present disclosure is generally represented by reference numeral 316. The splice plate 316 comprises a planar body 318. A lower wall 320 extends at a downward, outboard angle from the lower edge of the planar body 318. The lower wall 320 is angled such that, when installed on a rail, the lower edge of the lower wall rests against the lip 335 of the lower horizontal outboard flange 334b. A further advantage of the angled lower wall 320, as shown in particular in FIG. 14, is that a fastener can be inserted through a bottom opening of the vertical web 330 and the fastener head does not interfere with the splice plate 316.

The planar body defines at least two horizontally spaced fastener openings 324a, 324b. The openings are spaced such that when the left fastener opening 324a is aligned with a fastener opening closest to the longitudinal edge of the vertical web 330 of a first cable tray section 12, the right fastener opening 324b is aligned with the fastener opening closest to the longitudinal edge of the vertical web 330 of the second cable tray section 312b. Fasteners and nuts are used to secure the splice plate 316 to the rail by way of the fastener openings. In various embodiments, the planar body can define additional fastener openings 324c, 324d that are vertically spaced from fastener openings 324a, 324b. In use, fasteners can be optionally inserted into these openings to further secure the splice member 316 to the rail. Fastener openings 324a, 324b can contain threaded tubular shafts 327 on an outboard plane of the planar body 318 so that no nut is needed to secure a fastener 350. Fastener openings 324c, 324d can also include a tubular shaft, or do not include a tubular shaft, in which case a nut is used in conjunction with the fastener 352.

It is envisioned that prior to installation to an adjacent cable tray section, the splice plate member 316 is securely fastened to one cable tray section only. That is, a rear or front edge margin of the splice plate 316 is aligned with a rear or front longitudinal edge of the cable tray rail. Fastener openings 324a, 324b, and optionally 324c, 324d are aligned with openings on the vertical web 330 of one cable tray section 312 only. Fasteners are secured therethrough to prevent loose items during shipping or transport. When the cable tray section is to be fastened to an adjacent cable tray section, the installer removes the fasteners and nuts securing the splice member 316 to one cable tray section 312 and slides the splice member to an adjacent cable tray section to align at least one fastener opening with a corresponding opening in the vertical web 330 of the first cable tray section and at least one other fastener opening with a corresponding opening in the vertical web of the second cable tray section.

Figure 15:
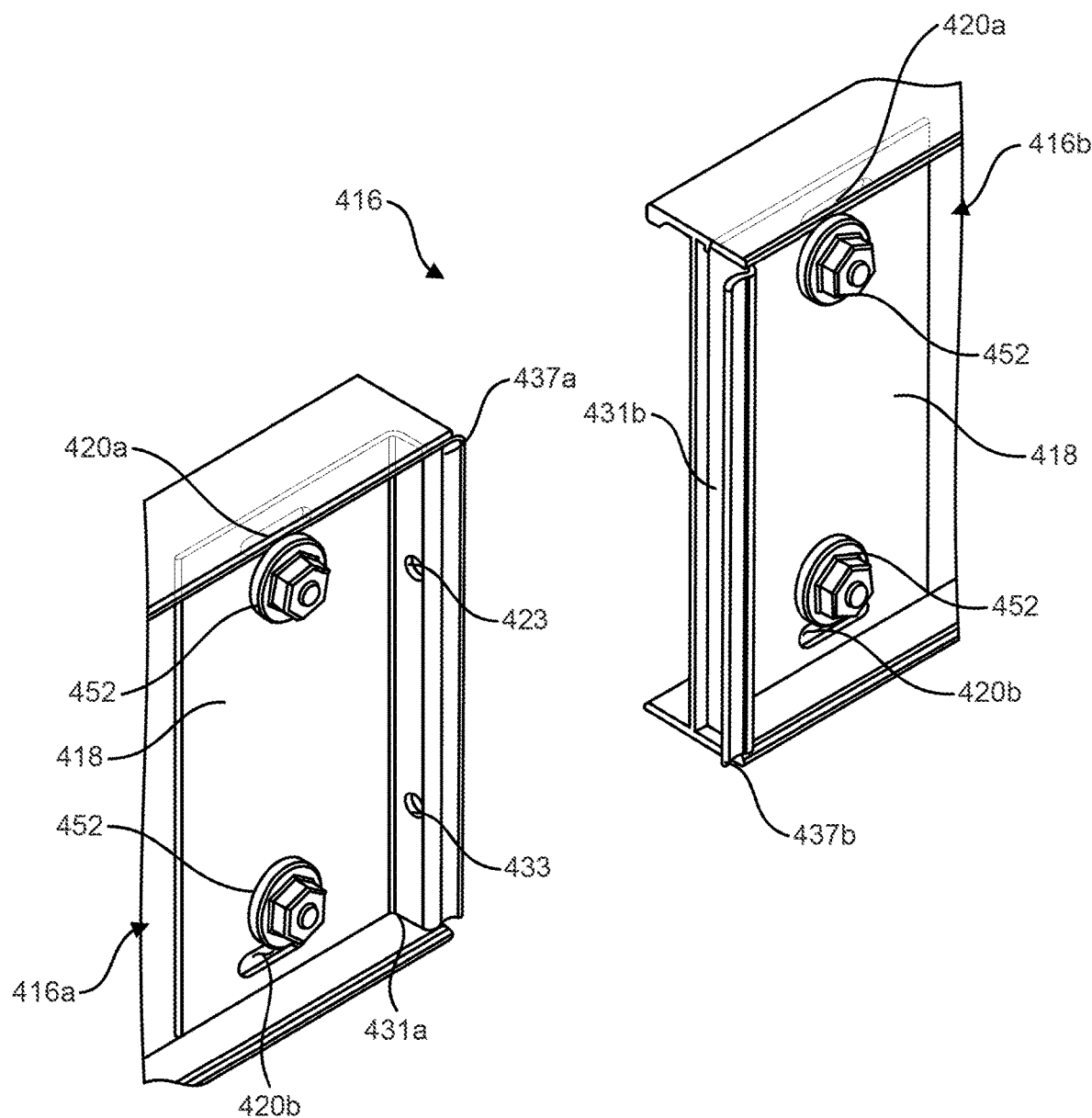
FIG. 15 is a perspective view of another embodiment of a splice plate with splice plate sections separated on adjacent cable tray sections and without an interface connector.
Figure 16:
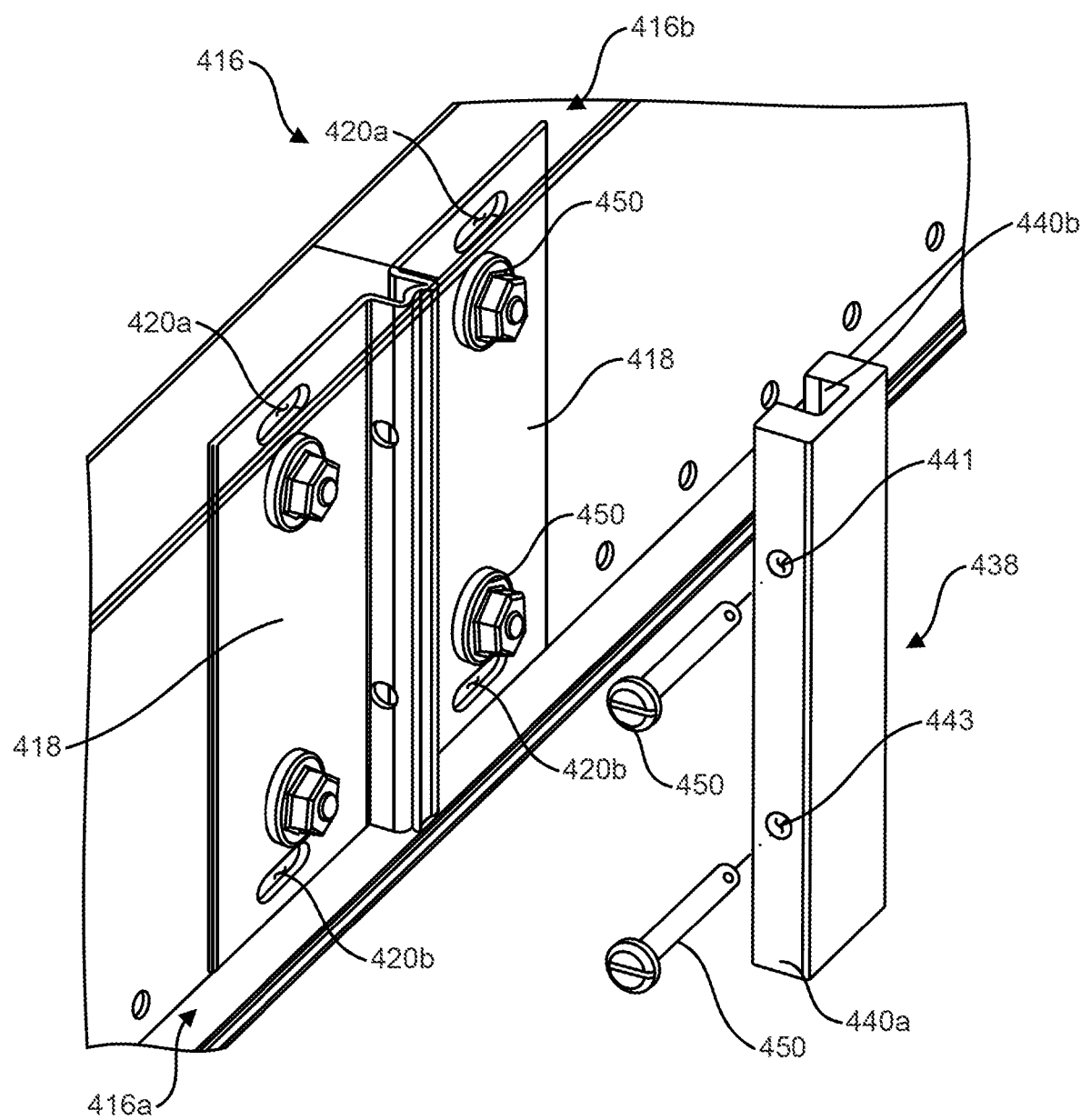
FIG. 16 is a perspective view of the splice plate of FIG. 15 with the splice plate sections connected and the interface connector in an exploded configuration.
Figure 17:
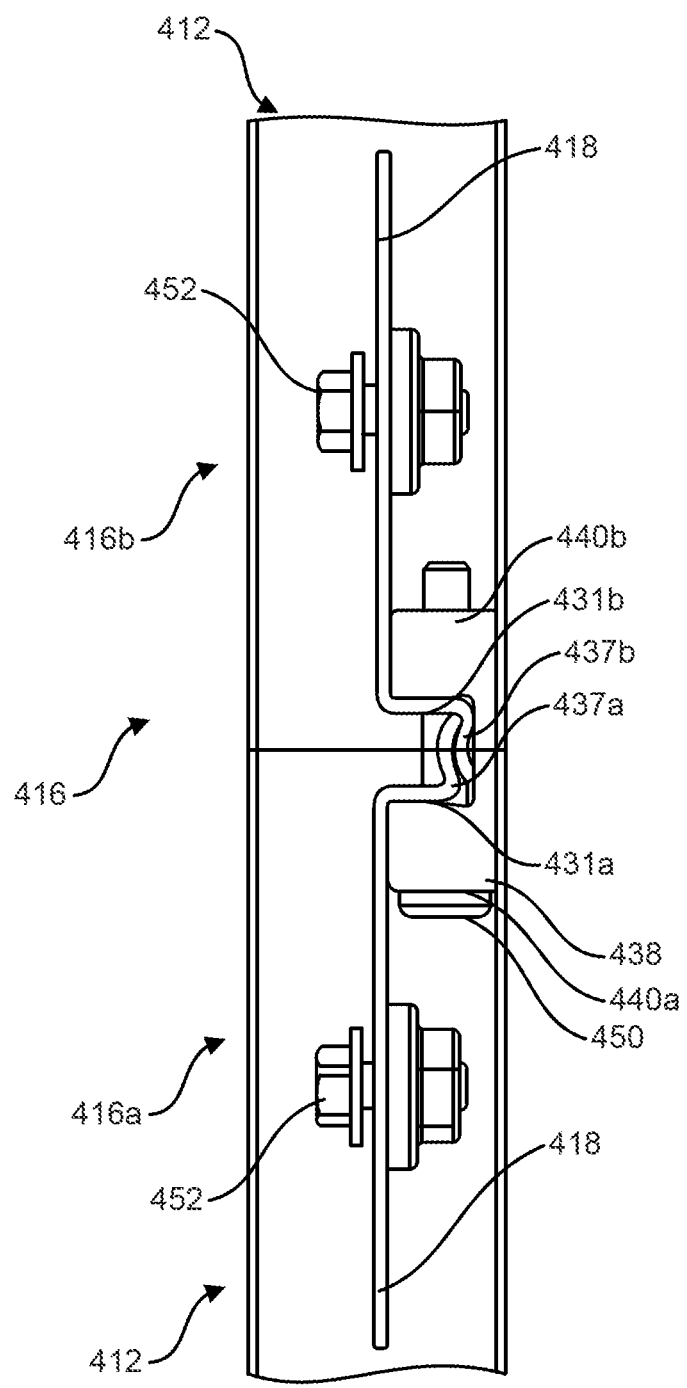
FIG. 17 is a top plan view of the splice plate of FIG. 16 with the splice plate sections connected and the interface connector installed, with the upper flange of the cable tray rail being transparent.

Turning now to FIGS. 15 to 17, a further embodiment of the splice plate assembly is generally indicated at reference numeral 416. Splice plate 416 includes first and second splice plates 416a, 416b. Each of splice plate sections 416a, 416b include a planar body 418. The planar body 418 defines elongated slots 420a, 420b at upper and lower ends thereof. The planar body 418 also defines fastener openings at upper and lower ends thereof (e.g., below the upper elongated slot 420a and above the lower elongated slot 420b). When the fastener opening is aligned with an opening on the vertical web 30 of the rail, a fastener 452 can be inserted therethrough to secure the splice plate section 416a, 416b to the rail. A nut can be used to assist with this process. In various embodiments, fasteners (optionally with nuts) can instead be inserted into elongated slots 420a, 420b to allow the splice plate assembly 416 to function as an expansion splice plate.

The right edge of the planar body 418 of the first splice plate 416a terminates in a flange 431a that extends outboard from and generally perpendicular to the planar body 418. The flange 431a defines at least one fastener opening. The illustrated embodiment defines two fastener openings 423, 433 at an upper and lower portion thereof. These fastener openings can be aligned with fastener openings on the planar body 418. The outboard edge of the flange 431a terminates in a convex lip 437a that is parallel to and extends in the same direction as the planar body 418.

Similarly, the left edge of the planar body 418 of the second splice plate 416b terminates in a flange 431a that extends outboard from and generally perpendicular to the planar body 418. The flange 431b defines at least one fastener opening. The illustrated embodiment defines two fastener openings 423, 433 at an upper and lower portion thereof. These fastener openings can be aligned with fastener openings on the planar body 418. The outboard edge of the flange 431b terminates in a convex lip 437b that is parallel to and extends in the same direction as the planar body 418 (i.e., convex lips 437a, 437b extend toward one another).

The convex lips 437a, 437b are similar shapes so that they mate or nest with one another. In order to allow the nesting, one of the flanges 430a, 430b (in the illustrated embodiment, 430a) is slightly shorter than the other flange to allow one flange to rest behind (more inboard to) the other. Typically, the splice plates 416a, 416b are sized so that a center point (e.g., the most concave point) of the lip 437a, 437b is at the longitudinal edge of the cable tray rail, such that when placed together, one half of the lip 437a, 437b extends past the longitudinal edge and across to the other cable tray section. When nested, fastener openings 423, 433 from both splice plates 416a, 416b are aligned. Fasteners can be inserted therethrough. Preferably, an interface connector 438 is placed over the nested lips 437a, 437b. The interface connector 438 is generally C-shaped and is sized to be securely received over the interfaced lips. The left and right walls 440a, 440b of the interface connector 438 define fastener openings 441, 443 that align with fastener openings 423, 433 of the flanges 430a, 430b. In this way, a fastener 450 can be placed through the interface connector fastener openings and fastener openings on both flanges such that the fastener extends through the interface connector, as shown in FIG. 17.

Figure 18:
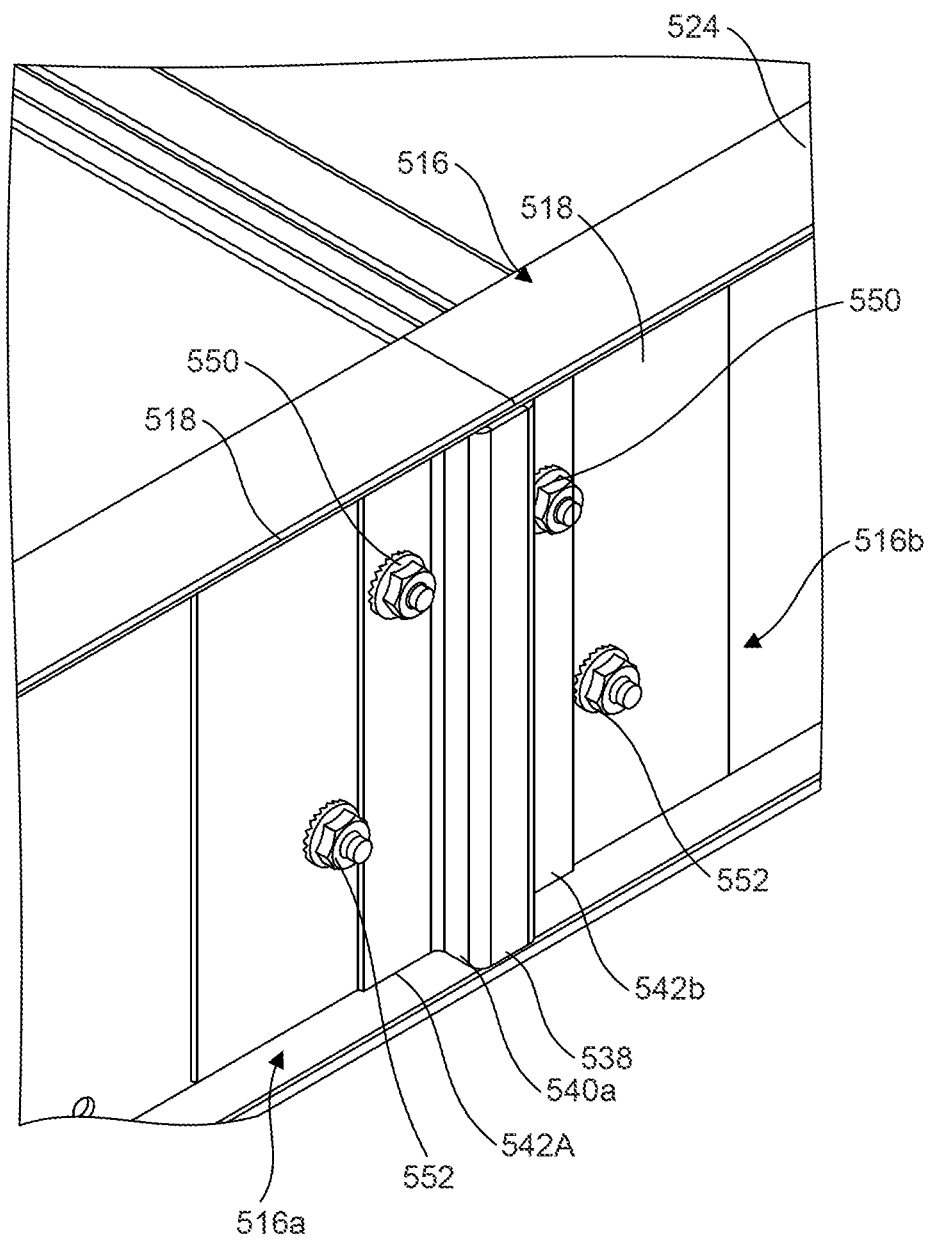
FIG. 18 is a perspective view of another embodiment of a splice plate installed on two adjacent cable tray sections.
Figure 19:
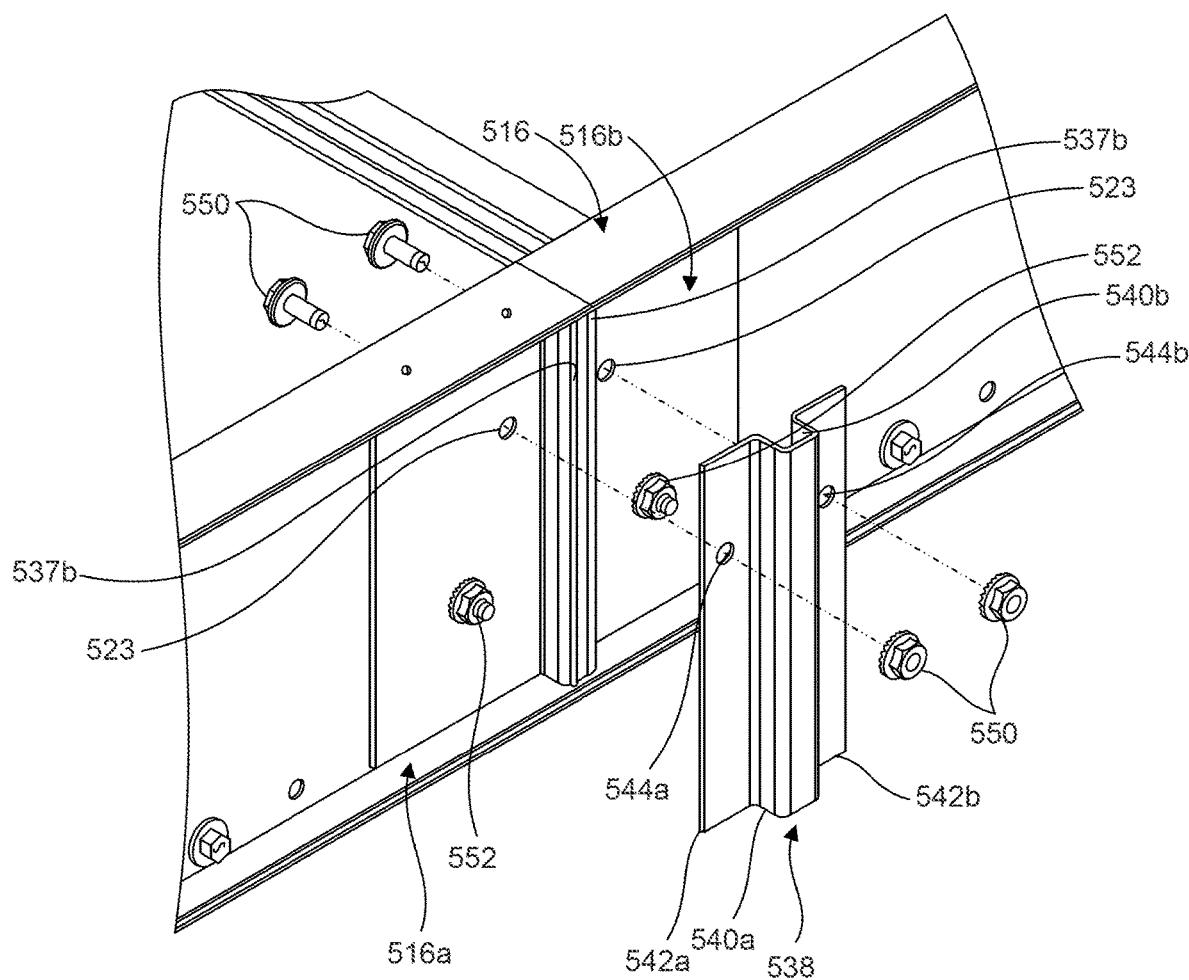
FIG. 19 is a perspective view of the splice plate of FIG. 18 with the interface connector in an exploded configuration.
Figure 20A:
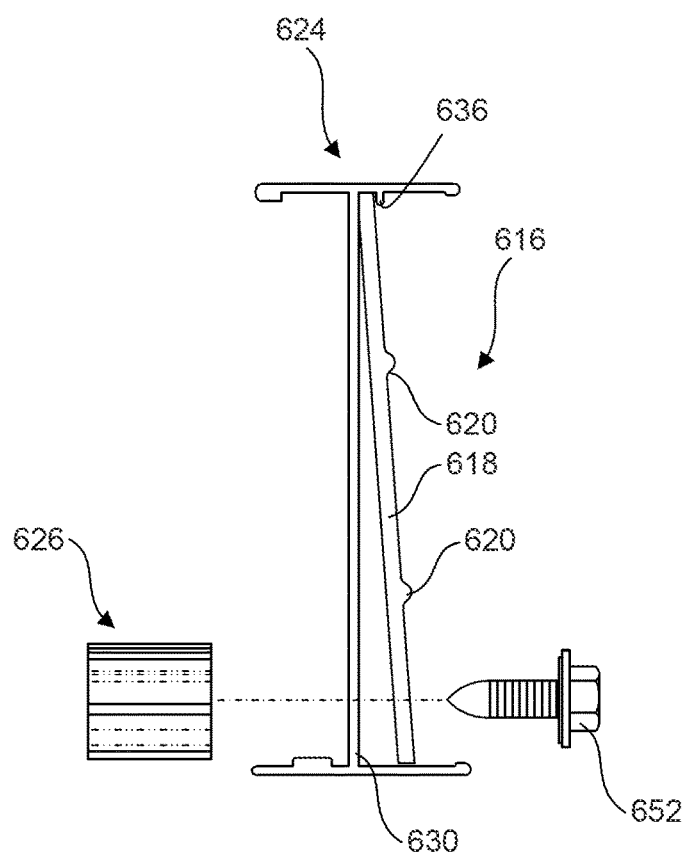
FIG. 20A is a side plan view of another embodiment of a splice plate during installation.
Figure 20B:
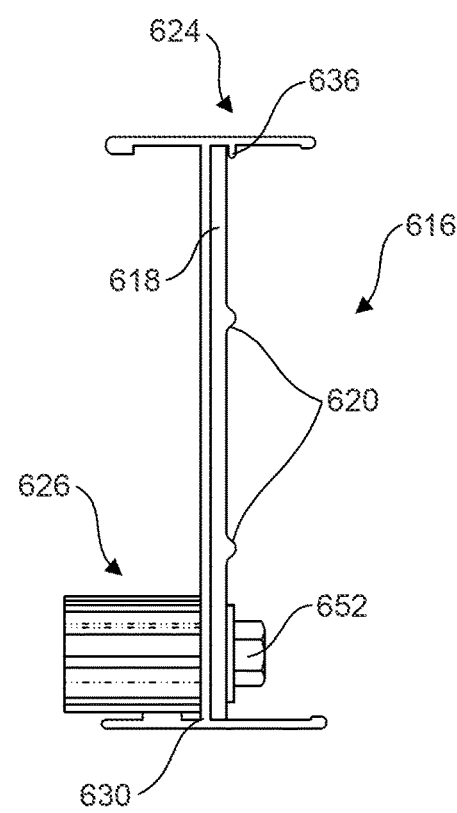
FIG. 20B is a side plan view of the splice plate of FIG. 20A in an installed position.
Figure 21:
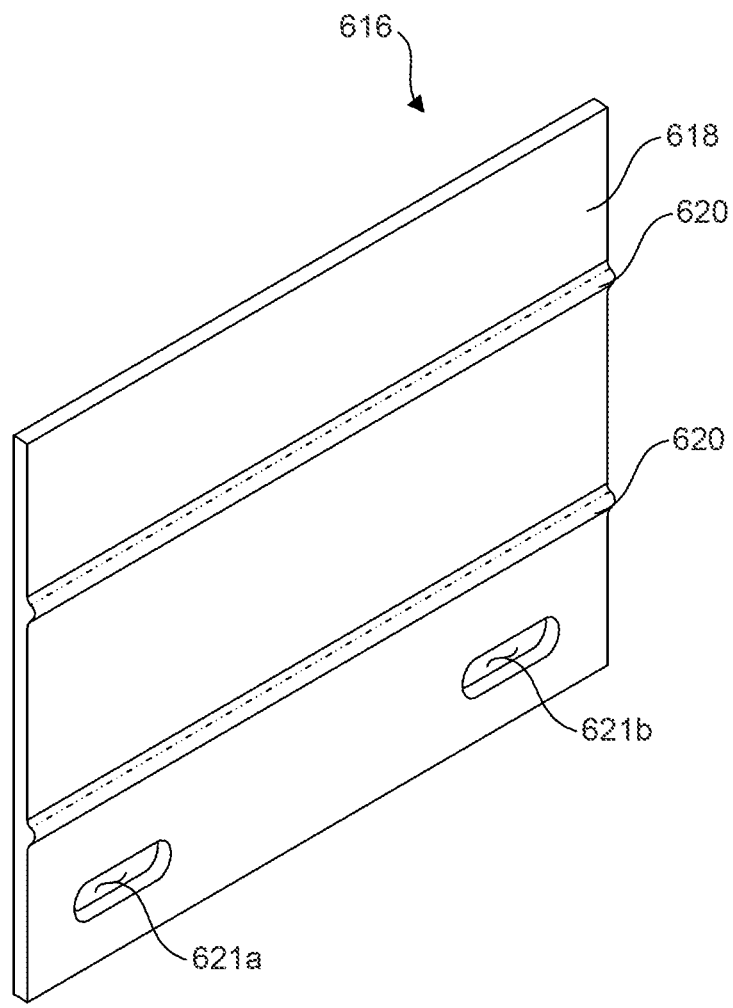
FIG. 21 is a perspective view of the splice plate of FIG. 20A.

Turning now to FIGS. 18 and 19, a further embodiment of the splice plate assembly is generally indicated at reference numeral 516. Splice plate 516 is similar to splice plate 416, and corresponding parts have been indicated by the same reference number plus 100. Each splice plate 516a, 516b defines a fastener opening on a lower central portion of the planar body 518. A fastener can be inserted through this opening and a corresponding opening on the vertical web 530 and threaded through a nut to secure the splice plate 516a, 516b.

Unlike the splice plate 416, the flanges 530a, 530b of the splice plate sections 516a, 516b do not define fastener openings. Instead, an additional fastener opening 523 is defined by the planar body 518 on an upper portion thereof near the flange 530a, 530b. Fastener opening 523 can be aligned with a corresponding opening defined by the vertical web 530. An interface connector 538 is placed over the nested lips 537a, 537b. The interface connector 538 is generally C-shaped and is sized to be securely received over the interfaced lips 537a, 537b. The inboard ends of the left and right walls 540a, 540b of the interface connector 538 are coupled to outwardly extending arms 542a, 542b. The arms 542a, 542b define fastener openings 544a, 544b that align with fastener openings 523 of the planar body 518. In this way, when the interface connector 538 is placed over the nested lips 537a, 537b, fasteners secured by nuts can be placed through the fastener openings 523 of the planar body 518 and the fastener openings 544a, 544b of the arms 542a, 542b thereby securing the interface connector 538 to the splice plates 516a, 516b, and the splice plates to one another.

Turning now to FIGS. 20A to 22B, a further embodiment of the splice plate of the present disclosure is generally indicated at reference numeral 616. The splice plate 616 comprises a planar body 618 with longitudinal ribs 620 vertically spaced to allow for reinforcement of the splice plate 616. The planar body defines at least two horizontally spaced elongated openings 621a, 621b. Using elongated slots in place of standard circular fastener openings allows for the splice plate 616 to function as an expansion splice plate. However, it is envisioned that standard circular fastener openings can be used in place of elongated openings 621a, 621b. The openings are spaced such that when the left opening 621a is aligned with a fastener opening closest to the longitudinal edge of the vertical web 630 of a first cable tray section 612, the right fastener opening 621b is aligned with the fastener opening closest to the longitudinal edge of the vertical web 630 of the second cable tray section 612. Fasteners 652 and nuts are used to secure the splice plate 616 to the rail by way of the elongated slots.

Figure 22A:
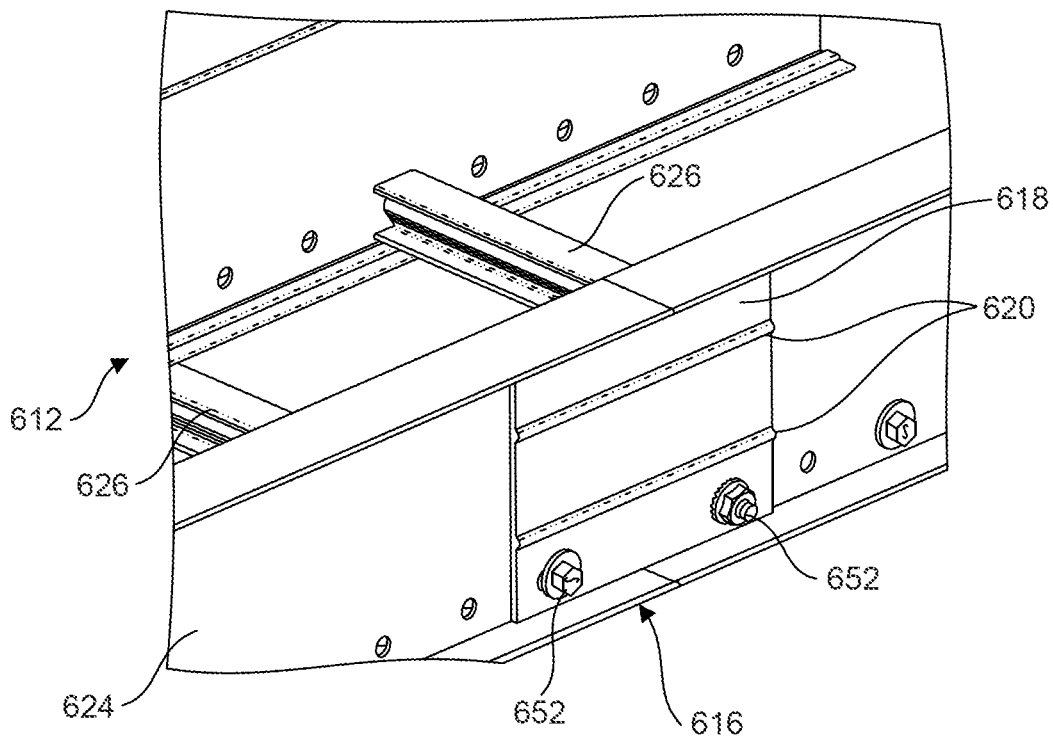
FIG. 22A is a front perspective view of the splice plate of FIG. 20A installed on adjacent cable trays.
Figure 22B:
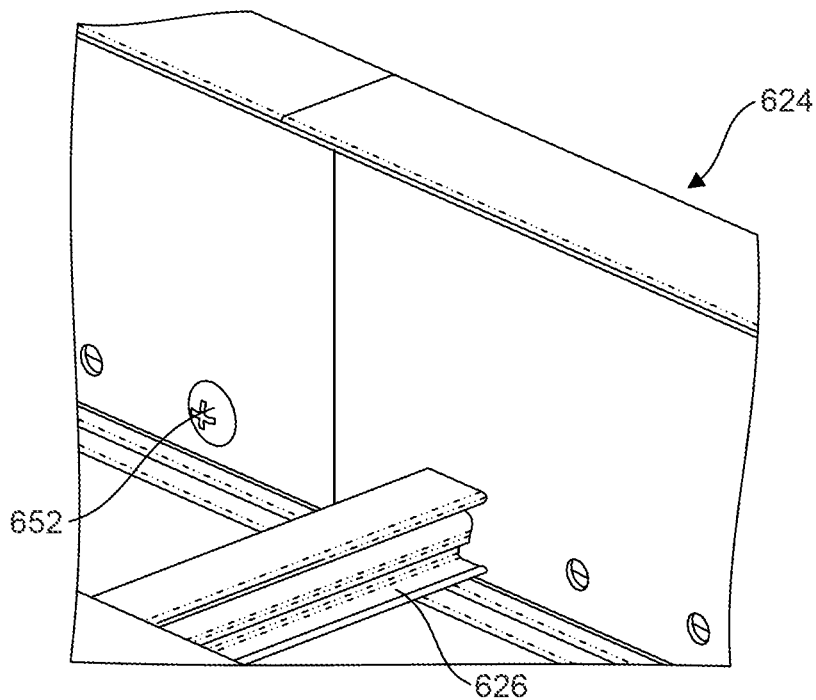
FIG. 22B is a rear perspective view of two cable tray sections connected by the splice plate of FIG. 20A.
Figure 23:
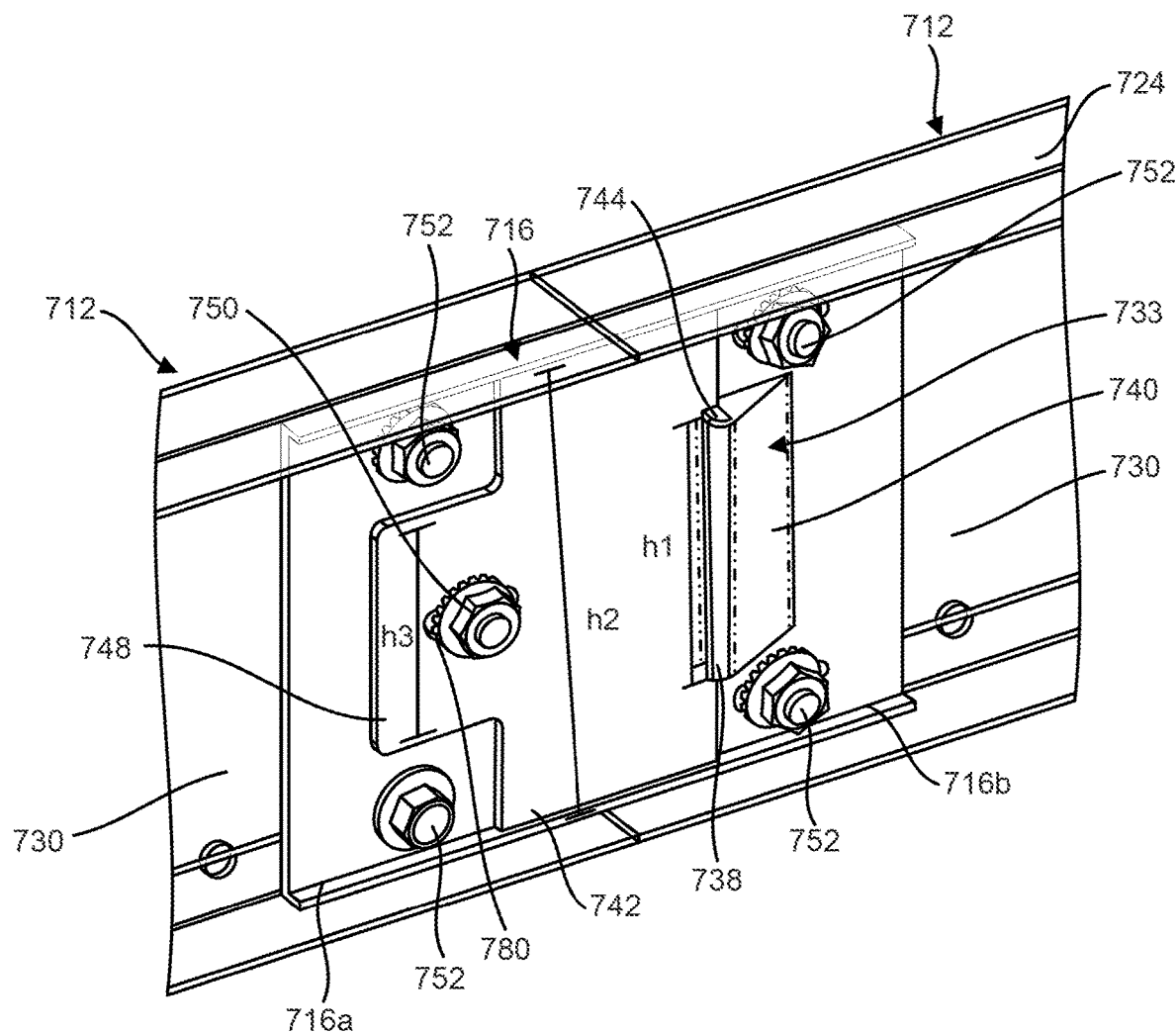
FIG. 23 is a perspective view of another embodiment of a splice plate installed on adjacent cable tray sections with the top flange of the cable tray rails being transparent.
Figure 24:
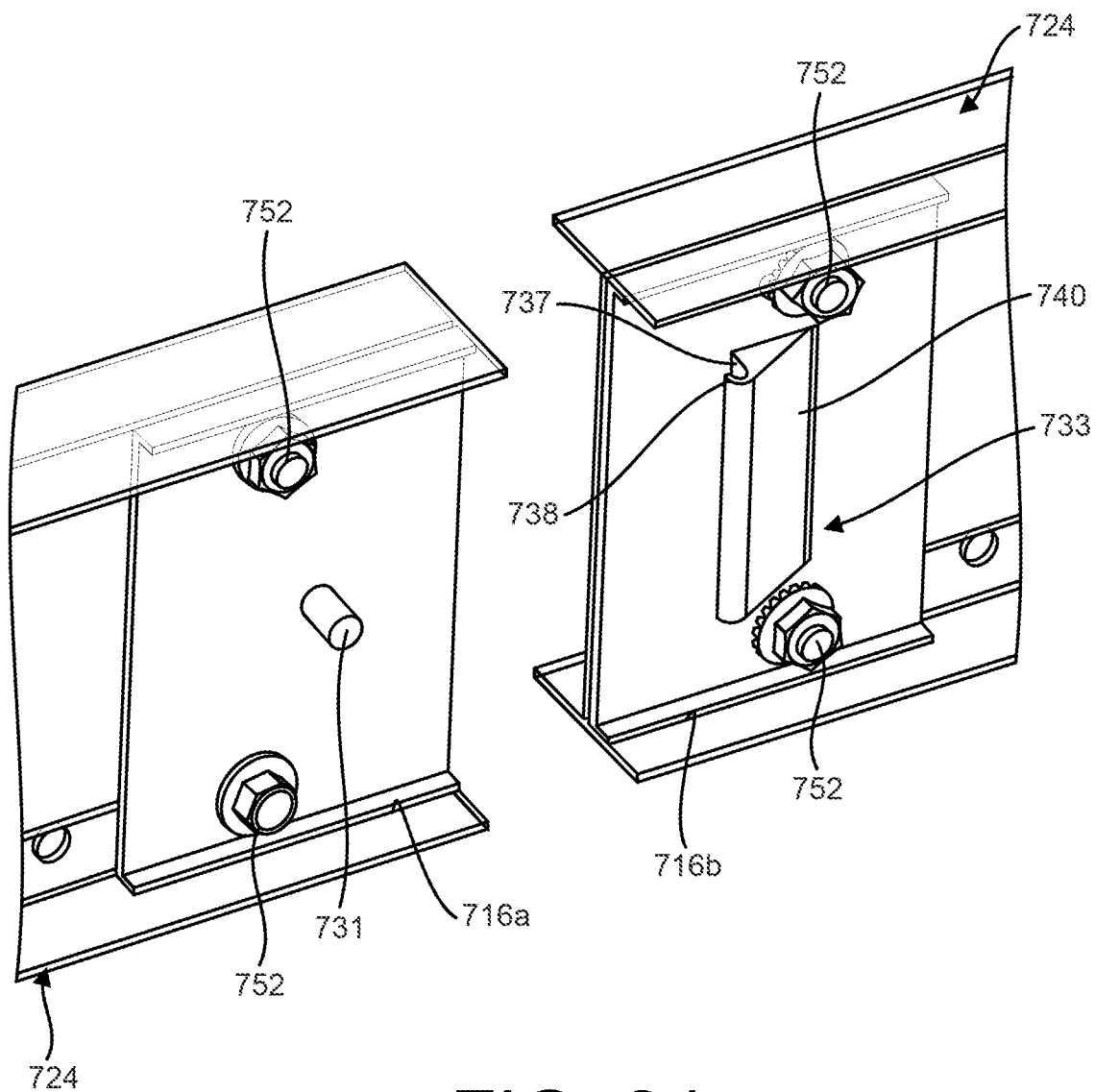
FIG. 24 is a perspective view of the splice plate of FIG. 23 with the cable tray sections separated and without a connector insert.
Figure 25:
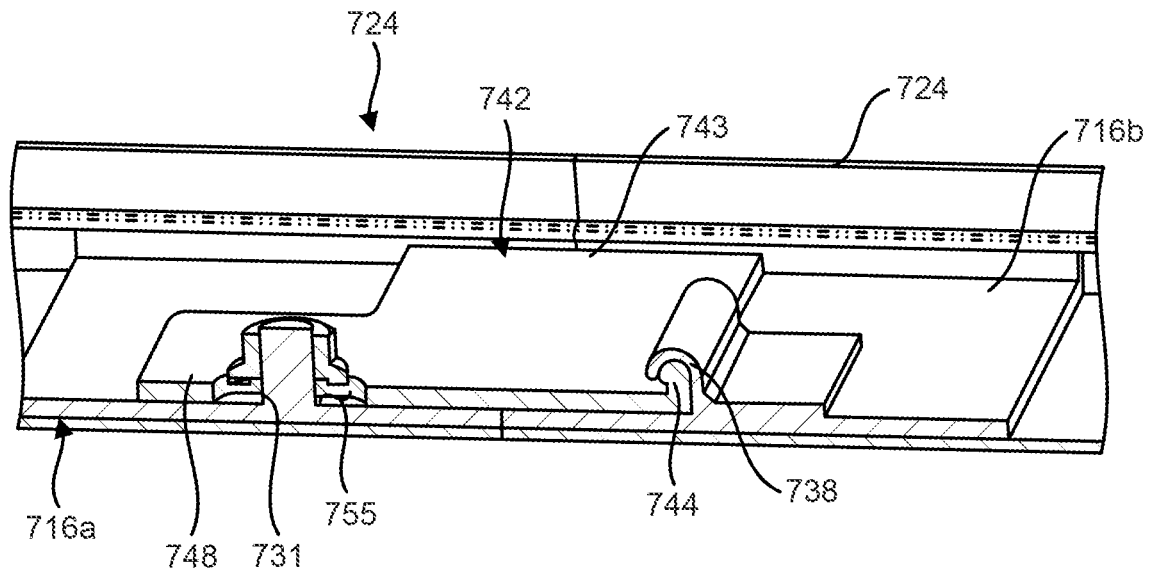
FIG. 25 is a cross section view taken through FIG. 24.
Figure 26:
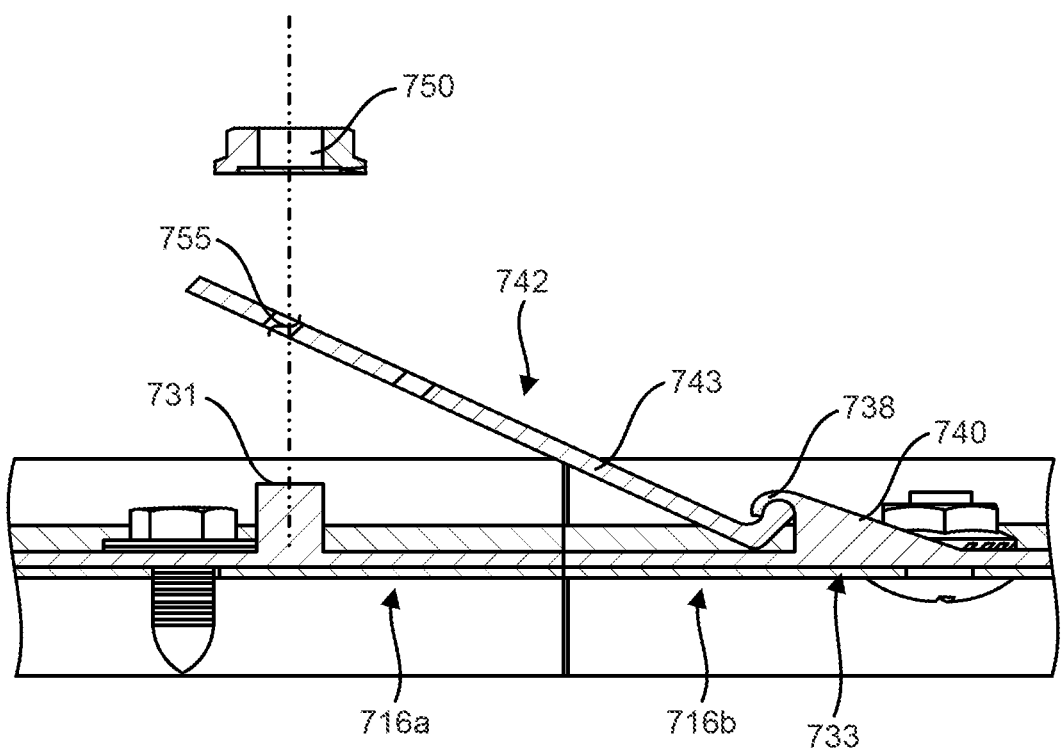
FIG. 26 is a cross section view taken through FIG. 25 showing the installation of the connector insert.

In various embodiments, the planar body 618 can define additional fastener openings (not shown) that are vertically spaced from fastener openings 621a, 621b. In use, fasteners can be optionally inserted into these openings to further secure the splice member 616 to the rail. Typically, a fastener 652 is inserted into fastener openings 621a, 621b where it engages a cable tray rung, thereby also fastening the cable tray rung to the rail. In other embodiments, a nut may be used to secure the fastener to the splice plate 616 and rail without engaging a rung (FIG. 22B). The top edge of the planar body 618 is inserted into the icicle groove 636 of the cable tray rail in order to secure the top of the splice plate 616 to the rail without the use of fasteners.

It is envisioned that prior to installation to an adjacent cable tray section, the splice plate 616 is securely fastened to one cable tray section only. That is, a rear or front edge margin of the splice member 616 is aligned with a rear or front longitudinal edge of the cable tray rail. Fastener openings 621a, 621b are aligned with openings on the vertical web of one cable tray section only. Fasteners are secured therethrough to prevent loose items during shipping or transport. When the cable tray section 612 is to be fastened to an adjacent cable tray section, the installer removes the fasteners 652 and nuts securing the splice member 616 to one cable tray section and slides the splice plate to an adjacent cable tray section to align at least one fastener opening with a corresponding opening in the vertical web 630 of the first cable tray section 612 and at least one other fastener opening with a corresponding opening in the vertical web of the second cable tray section.

Turning now to FIGS. 23 to 26, a further embodiment of a splice plate assembly of the present disclosure is generally represented by reference numeral 716. The splice plate 716 includes first and second splice plates 716a, 716b. Splice plates 716a, 716b are generally planar. The splice plates 716a, 716b defines fastener openings at a lower end thereof. Optionally, the splice plates 716a, 716b can also define an additional fastener opening vertically spaced from the fastener opening and at an upper portion of the splice plates 716a, 716b. When the fastener opening is aligned with an opening on the vertical web 730 of the rail, a fastener 752 can be inserted therethrough to secure the splice plate 716a, 716b to the rail. A nut can be used to assist with this process. In embodiments that do not have an upper fastener opening, or where the upper fastener is not used, the top portion of the splice plate 716a, 716b can be secured to the rail by placing the top edge thereof in an icicle groove and fastening the bottom portion only.

The first splice plate 716a includes an outwardly extending (i.e., in the outboard direction) post 731. In the illustrated embodiment, the post is cylindrical and has a circular cross section, although may different cross section shapes can be used without departing from the scope of the present disclosure. The post 731 is positioned near the center of the first splice plate 716a.

The second splice plate 716b includes an outwardly extending (i.e., in the outboard direction) triangular protrusion 733. That is, the section splice plate includes an outwardly extending wall 737 that extends generally perpendicular to the body of the splice plate section 716. The wall 737 terminates with an inwardly extending hook 738, the hook 738 being on the side of the protrusion 733 nearest the first splice plate 716a when installed. An angled wall 740 extends from the outboard end of the wall 737 toward (but not coupled to) the right side edge of the splice plate 716a.

When installed, an insert 742 couples the first slice plate 716a to the section splice plate 716b. The insert 742 comprises a generally planar main body portion 742 with one edge terminating in an outwardly extending (i.e., in the outboard direction) tab 744. The tab 744 is sized and shaped to be received within the hook 738 of the second splice plate section 716b. The height h1 of the tab 744 can be less than the height h2 of the main body portion 743 of the insert 742, and is generally equal to or substantially similar to the height of the outwardly extending wall 737 of the second splice plate 716b. In contrast, the height h2 of the main body portion 743 of the insert 742 is generally equal to the height of the vertical web 730 of the rail.

The other edge of the main body portion 742 of the insert 742 terminates in an extension portion 748. The height h3 of the extension portion 748 is generally less than the height h2 of the main body portion 743, and can be the same or different as the height h1 of the tab 744. The height h3 is generally selected so that extension portion 748 does not interfere with fastener openings when present. The extension portion 748 defines an opening 755 thereon sized and positioned to receive the post 731 of the first splice plate 716a. Once the post 731 is received therein, a cap 750 can be placed over the post to secure the insert 742 in place, and thereby secure the first and second splice plates 716a, 716b together.

Figure 27:
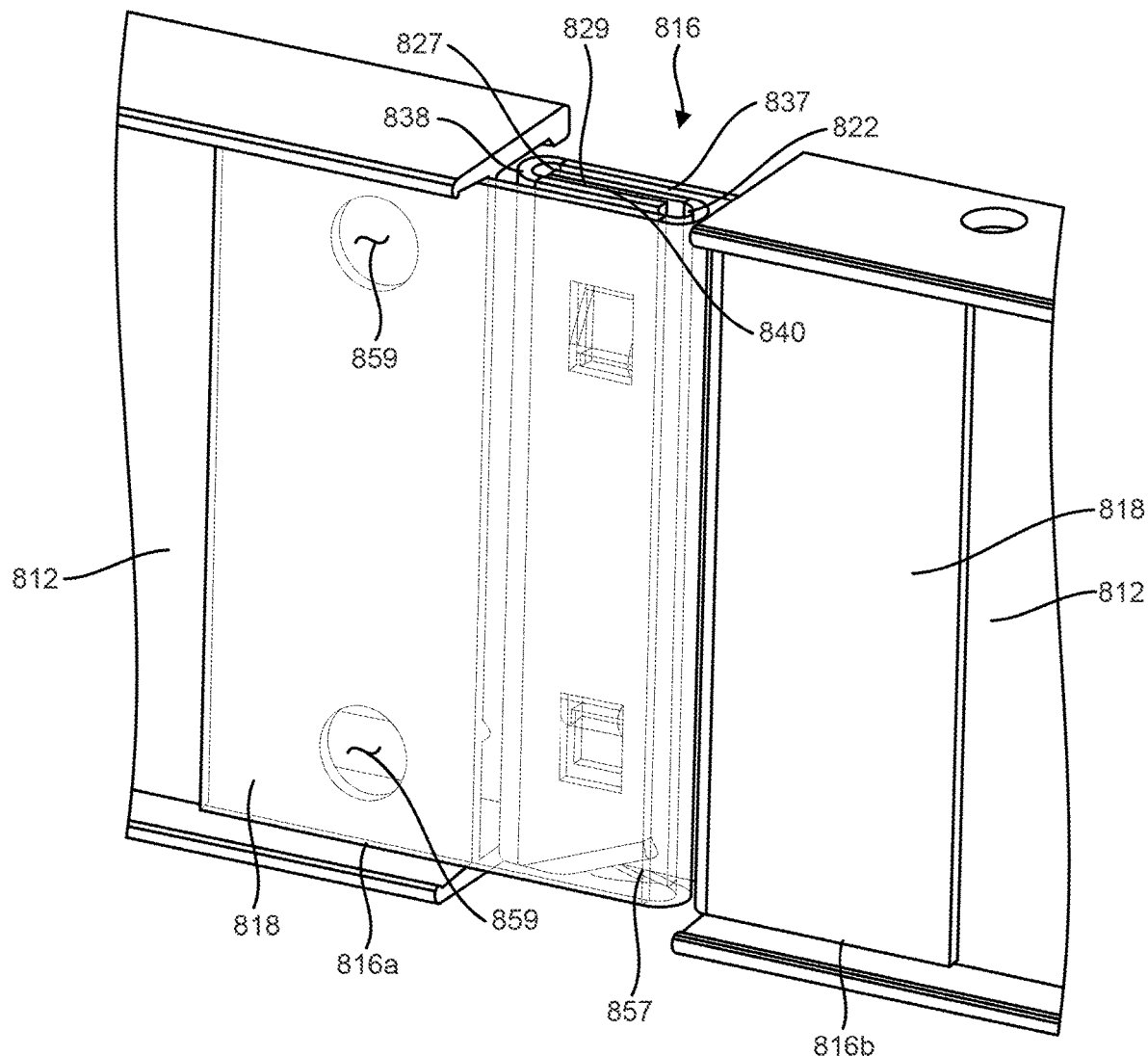
FIG. 27 is a perspective view of another embodiment of a splice plate installed on and connecting adjacent cable tray sections, with the first splice plate section being transparent.
Figure 28:
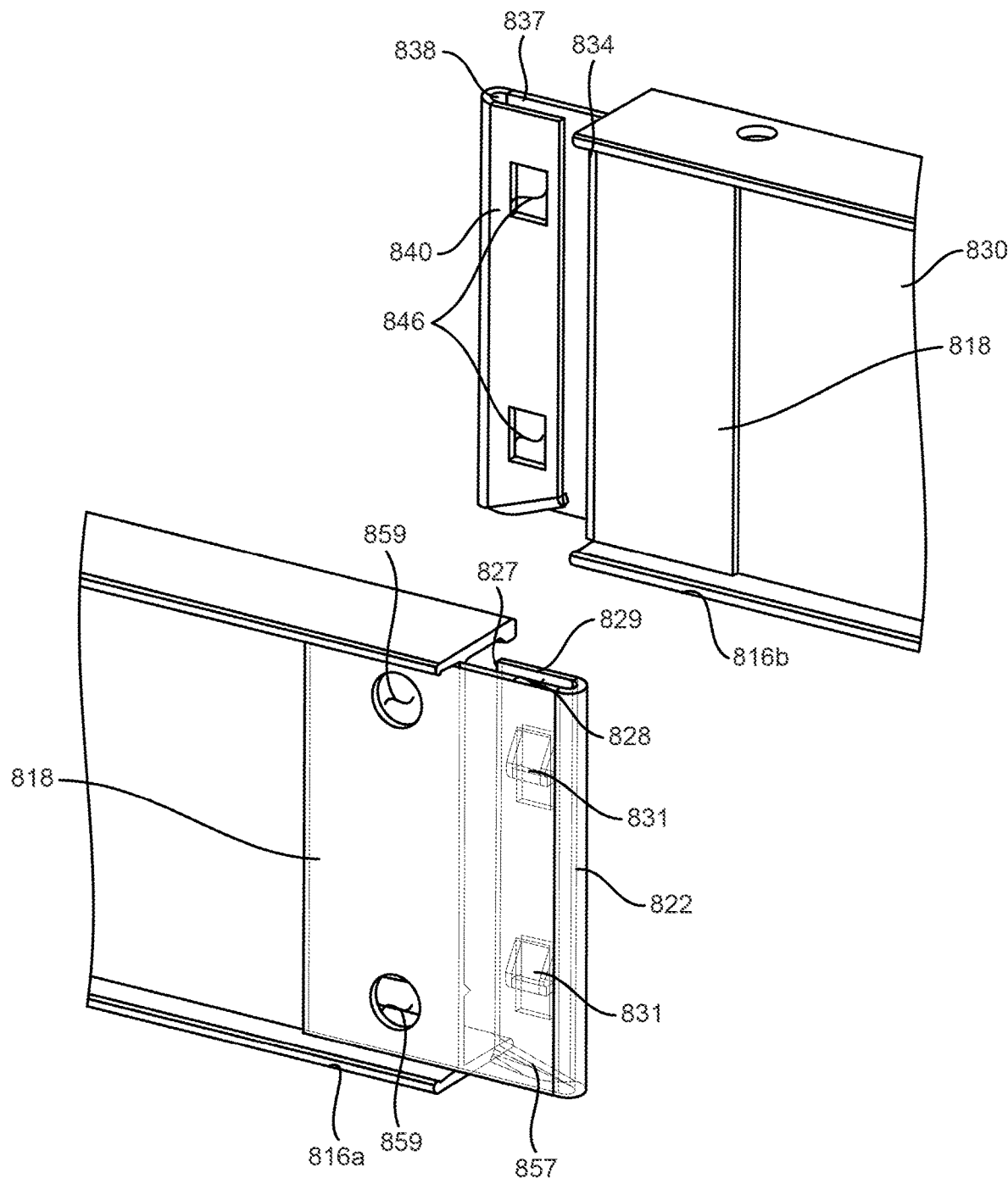
FIG. 28 is a perspective view of the splice plate of FIG. 27 with the splice plate sections and cable tray sections separated.

Turning now to FIGS. 27 and 28, yet another embodiment of the splice plate assembly of the present invention is generally indicated by reference numeral 816. The splice plate assembly 816 includes first and second splice plates 816a, 816b. Splice plates 816a, 816b comprise a generally planar main body portion 818. The main body portion 818 of the splice plates 816a, 816b can include fastener openings 859 thereon to receive a fastener to thereby fasten the splice plates 816a, 816b to the rail. In other embodiments, the splice plates 816a, 816b can be welded to their respective cable tray sections 812. It is envisioned that the cable tray sections 812 will be shipped with the splice plates 816a, 816b already installed so that, when installing a cable tray, the installer can easily couple cable tray sections together, and preferably without using tools.

Turning in particular to the first splice plate 816a, the main body portion 818 of the first splice plate 816a extends past the longitudinal end of the cable tray section. The main body portion 818 terminates in an inwardly extending (i.e., in the inboard direction) curved wall 822, although the wall 822 can be planar and not curved without departing from the scope of the present disclosure. The inboard edge of the wall 822 terminates in a slot wall 829, extending back toward the main body portion 818 and generally parallel to the main body portion 818 and perpendicular to the wall 822. The slot wall 829 terminates in a free edge 827. The free edge 827 is near but not in contact with the rail. Thus, the slot wall 829 and the extended main body portion 818 define a slot 828. The slot wall 829 includes at least one inward facing snap 831. For example, the illustrated embodiment includes two vertically spaced snaps 831.

The main body 818 of the second splice plate 816b terminates in an inwardly extending (i.e., in the inboard direction) first wall 834 at the longitudinal edge of the cable tray section 812. The first wall 834 is generally perpendicular to the main body 818 and extends past the vertical web 830 of the rail. The inboard edge of the first wall 834 is joined to a second wall 837. The second wall 837 is generally perpendicular to the first wall 834 and parallel to and extending away from the main body 818. The second wall 837 terminates in an outwardly extending (i.e., in the outboard direction) curved wall 838, although the wall 838 can be planar and not curved without departing from the scope of the present disclosure. The outboard edge of the wall 838 terminates in a slot wall 840 extending back toward the main body portion 818 and generally parallel to the main body portion 818 and perpendicular to the wall 822. The slot wall 840 terminates in a free edge 842. The free edge 842 is near but not in contact with the rail. Thus, the slot wall 829 and the second wall 837 define a slot 844. The slot wall 840 defines at least one opening 846 sized and shaped to receive the at least one snap 831 of the first splice plate section 816a. For example, the illustrated embodiment includes a slot wall 840 defining two vertically spaced openings 846 receiving two snaps 831 of the first splice plate section 816a.

During installation, the second splice plate 816b is slid to mate with the first splice plate 816a. That is, the slot wall 840 of the second splice plate section is slid to rest inside the slot 828 of the first splice plate section 816a. In this way, the slot wall 829 of the first splice plate 816a rests inside the slot 844 of the second splice plate 816b. The snaps 831 of the first splice plate 816a engage the corresponding openings 846 of the second splice plate 816b. The bottom edge of the slot wall 829 of the first splice plate section 816a can include a stopper flange 857 extending toward the main body portion 818. The stopper flange 857 prevents the slot wall 840 of the second splice plate 816b from sliding all the way through the slot 828 of the first splice plate 816a.

Figure 29:
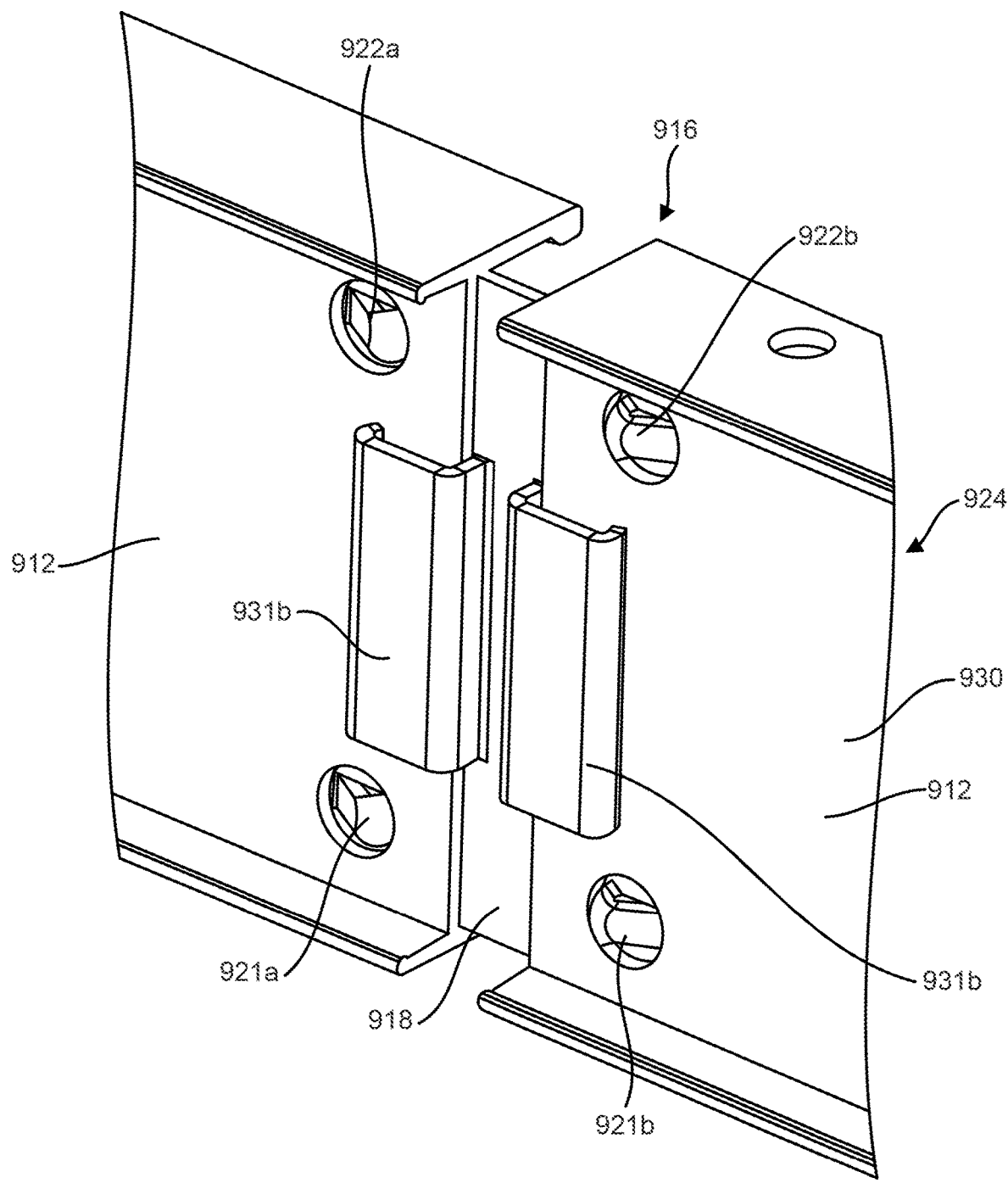
FIG. 29 is a perspective view of another embodiment of a splice plate installed on and connecting adjacent cable tray sections.
Figure 30:
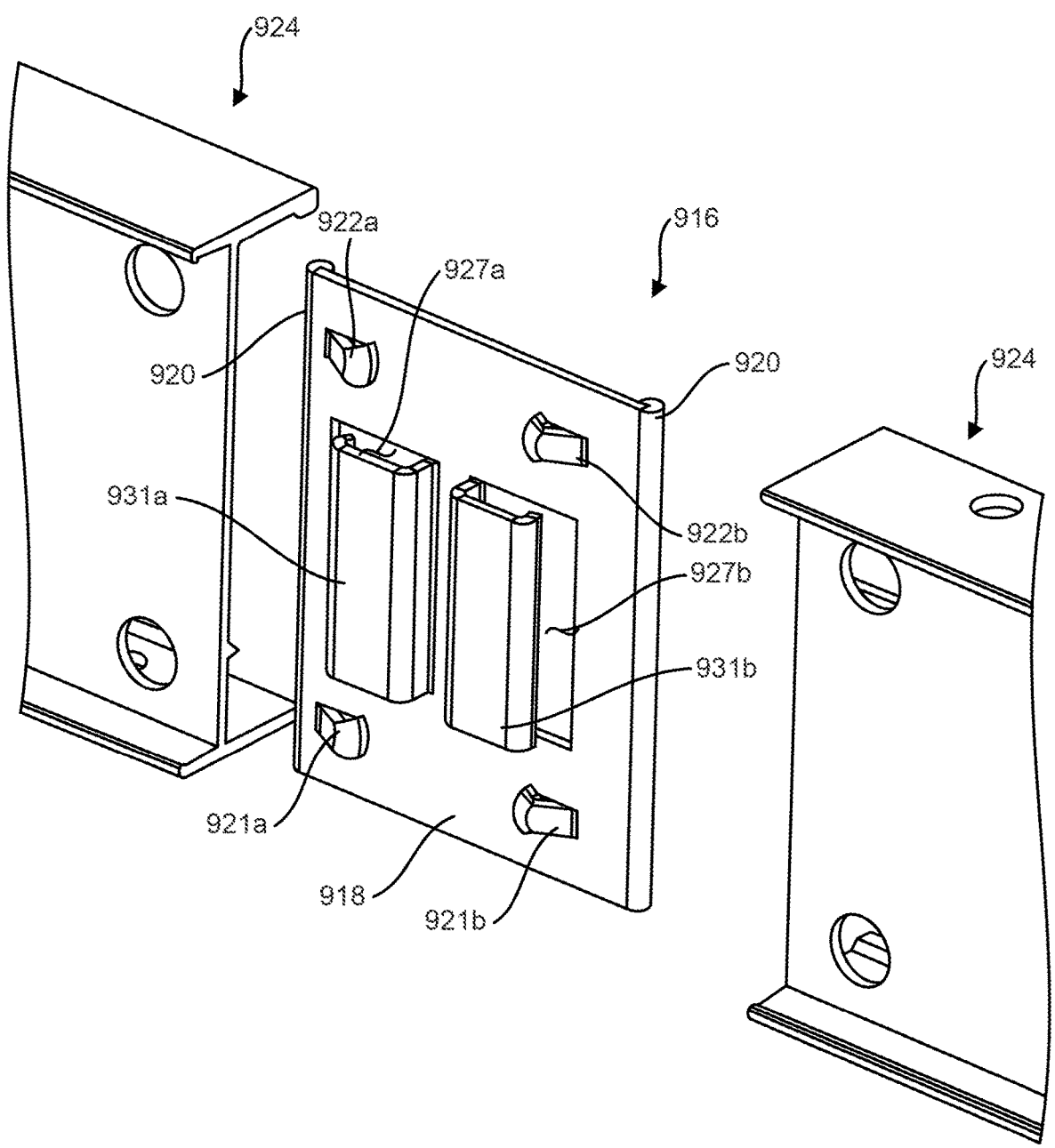
FIG. 30 is an exploded perspective view of the splice plate and cable tray sections of FIG. 29.

Turning now to FIGS. 29 and 30, a further embodiment of the splice plate of the present disclosure is generally indicated by reference numeral 916. The splice plate 916 includes a generally planar body 918. Both the left and right edges of the planar body 918 terminate in a rounded edge 920. The upper portion of the body 918 includes two horizontally spaced snaps 922a, 922b, and the lower portion of the body 918 includes two additional horizontally spaced snaps 921a, 921b. These snaps 922a, 922b, 921a, 921b are configured to be received by openings in the vertical web of adjacent cable tray section 912

The central portion of the body 918 defines two adjacent openings 927a, 927b. The openings 927a, 927b are formed by punching out the material use to form the two outwardly extending (i.e., in the outboard direction) U-shaped protrusions 931a, 931b. In use, the protrusions 931a, 931b are slid onto adjacent cable tray sections 912, with the snaps 922a, 922b, 921a, 921b snapping into the vertical web 930 openings.

Figure 31:
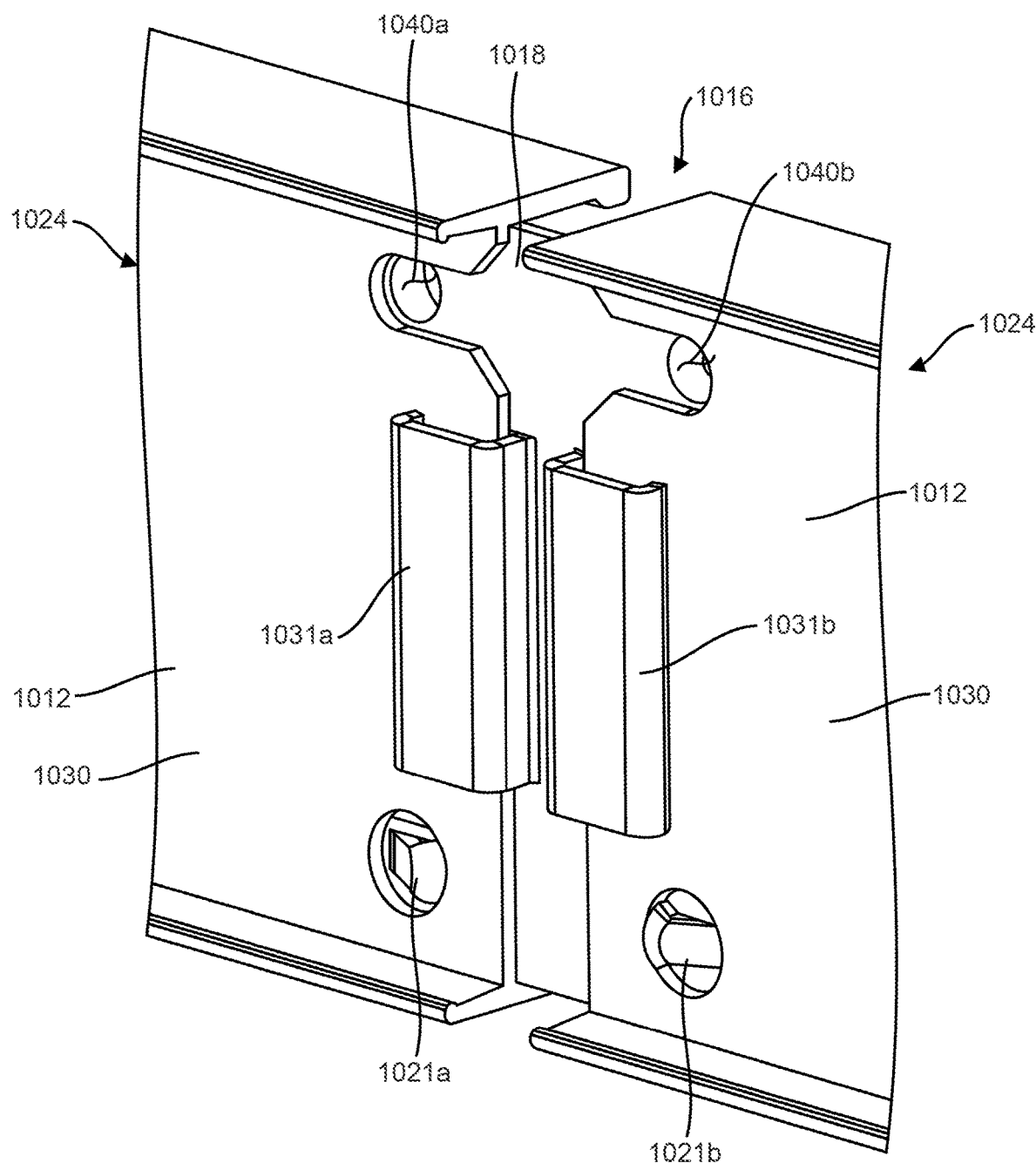
FIG. 31 is a perspective view of another embodiment of a splice plate installed on and connecting adjacent cable tray sections.
Figure 32:
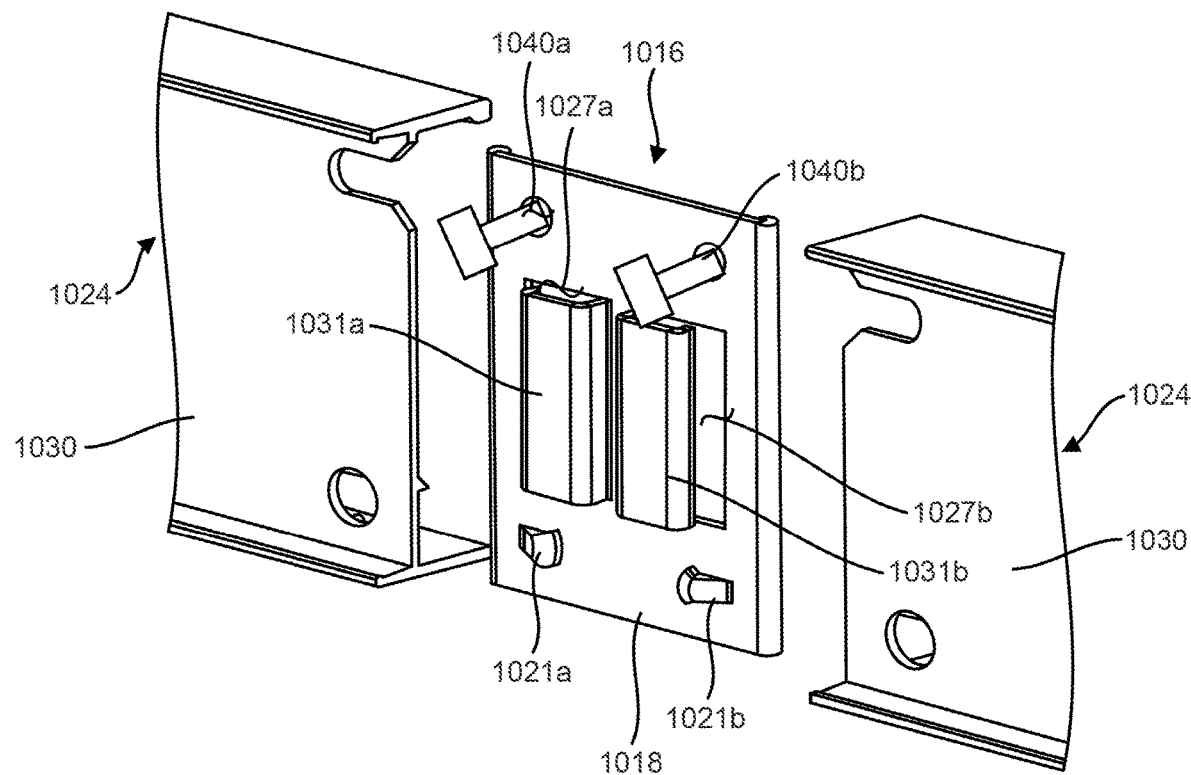
FIG. 32 is an exploded perspective view of the splice plate and cable tray sections of FIG. 31.
Figure 33:
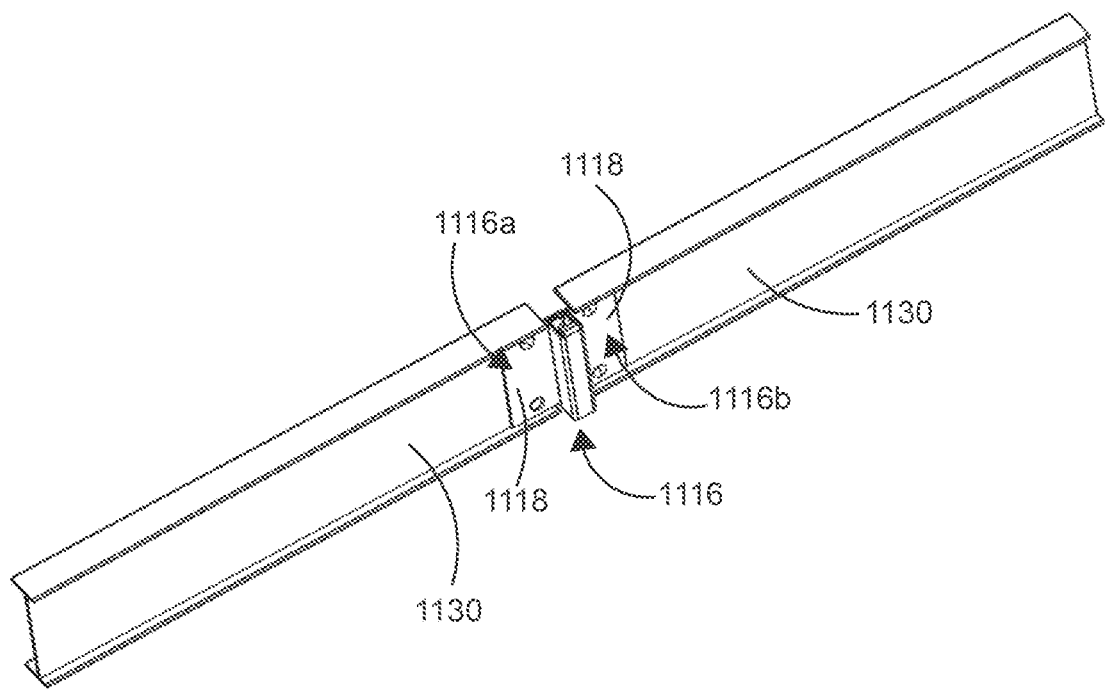
FIG. 33 is a perspective view of another embodiment of a splice plate installed on and connecting adjacent cable tray sections.
Figure 34:
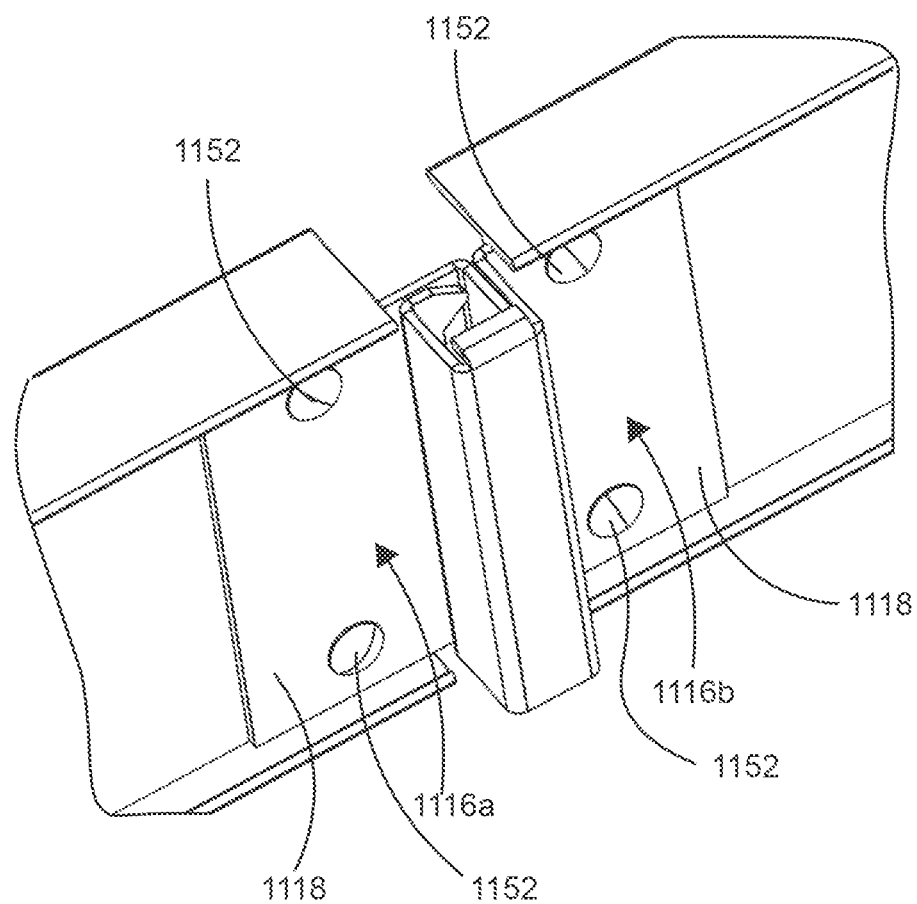
FIG. 34 is an enlarged fragmentary perspective view of the splice plate of FIG. 33 with the splice plate sections installed on and connecting adjacent cable tray sections.
Figure 35:
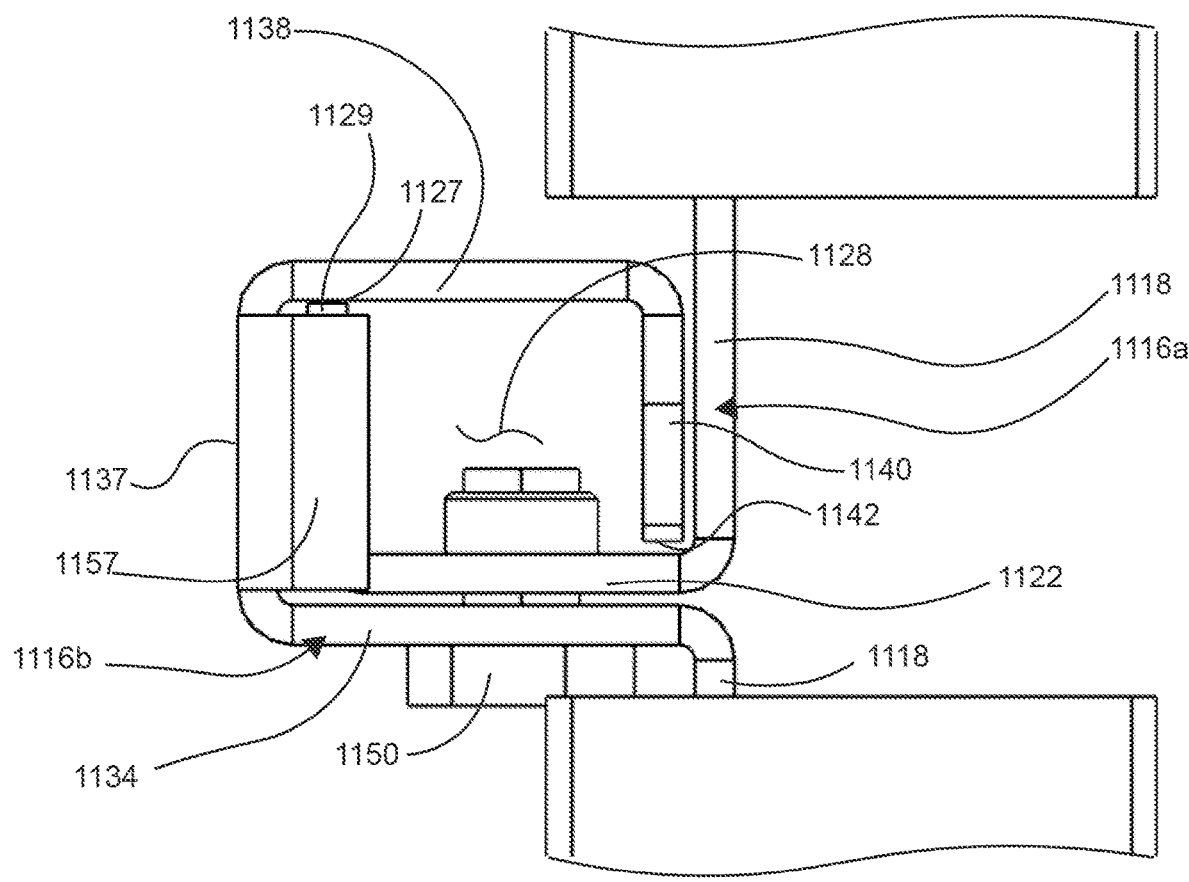
FIG. 35 is an enlarged fragmentary top plan view of the splice plate of FIG. 33 with the splice plate sections connected.
Figure 36:
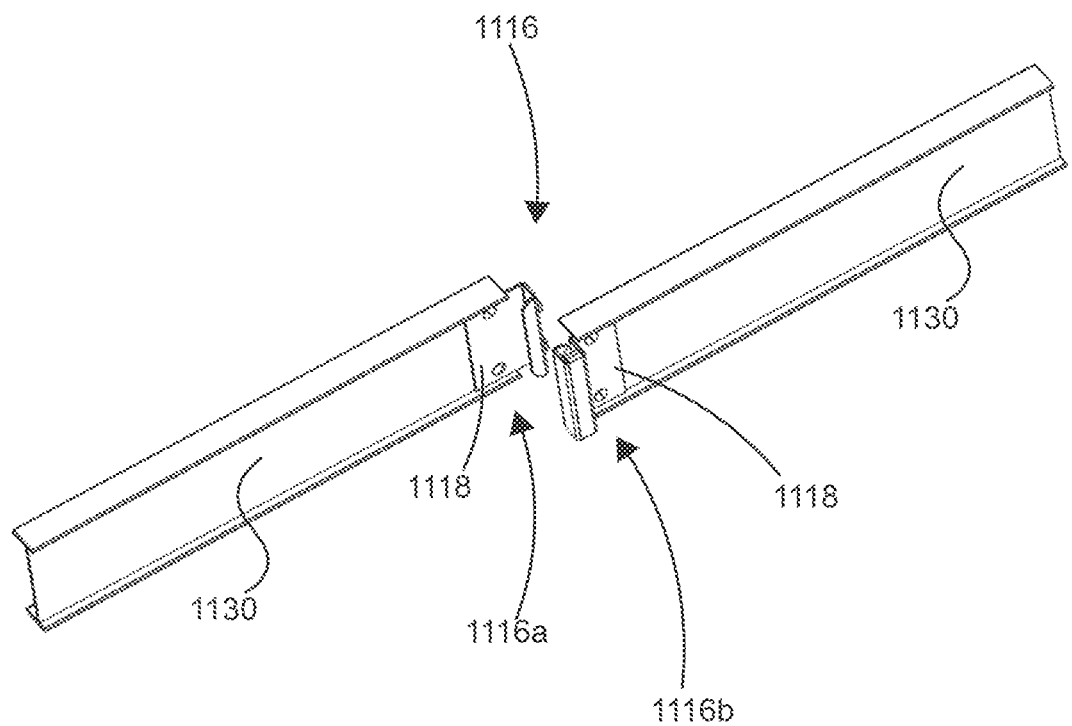
FIG. 36 is a perspective view of the splice plate of FIG. 33 with the splice plate sections and cable tray sections separated.

Turning now to FIGS. 31 and 32, a further embodiment of the splice plate is generally indicated at reference numeral 1016. Splice plate 1016 is similar to splice plate 916, and corresponding parts have been indicated by the same reference number plus 100. Instead of upper snaps 922a, 922b, the splice plate 1016 defines fastener openings 1040a, 1040b. In this way, the fastener openings on the vertical web 1030 can be replaced with U-shaped slots, although it is understood that standard openings can also be used. In this way, when installed, a bolt (e.g., a flanged bolt) can be inserted through the slot and into the fastener openings 1040a, 1040b to fasten the splice plate 1016 to the cable tray sections 1012

Turning now to FIGS. 33 through 37, a further embodiment of the splice plate assembly is generally indicated at reference numeral 1116. Splice plate 1116 is similar to splice plate 816, and corresponding parts have been indicated by the same reference number plus 300. Each splice plate 1116a, 1116b defines a fastener opening on a lower central portion of the planar body 1118. A fastener 1152 can be inserted through this opening and a corresponding opening on the vertical web 1130 and threaded through a nut to secure the splice plate 1116a, 1116b.

Figure 37:
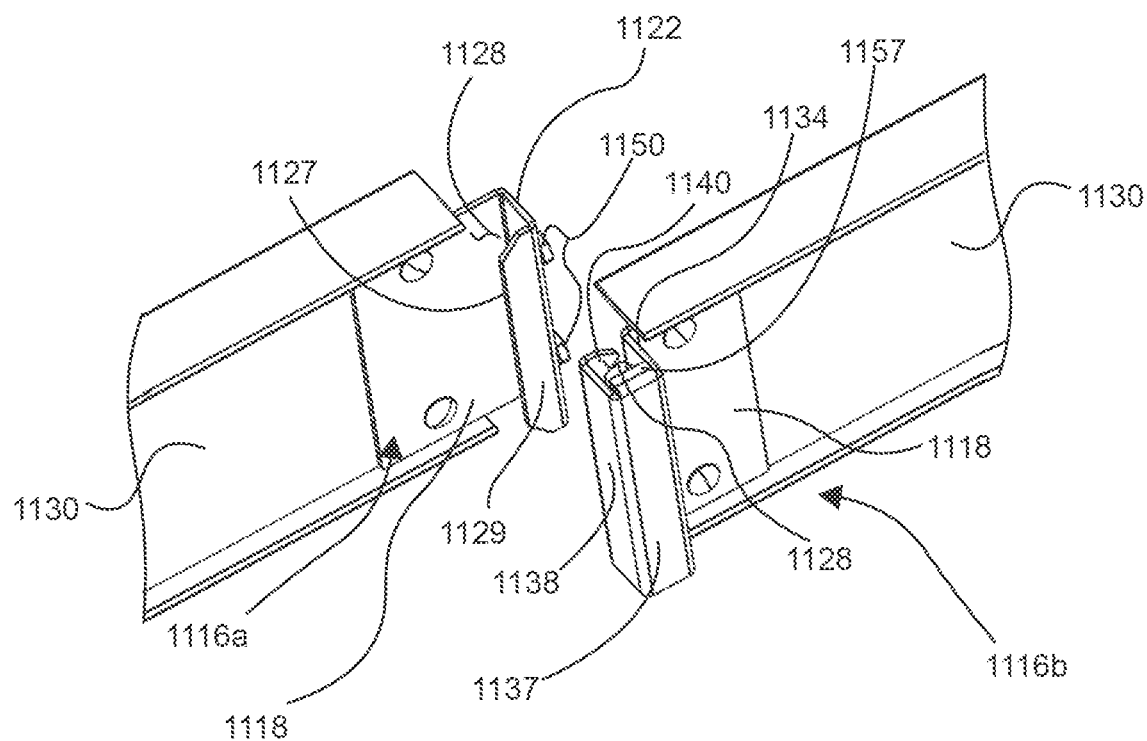
FIG. 37 is an enlarged fragmentary perspective view of FIG. 36.

Turning in particular to the first splice plate 1116a, the main body portion 1118 of the first splice plate 1116a extends past the longitudinal end of the cable tray section. The main body portion 1118 extends to an outwardly extending (i.e., in the outboard direction) planar wall 1122, although the wall 1122 can be curved without departing from the scope of the present disclosure. The outboard edge of the planar wall 1122 terminates at a slot wall 1129, extending back toward the main body portion 1118 and generally parallel to the main body portion 1118 and perpendicular to the planar wall 1122. The slot wall 1129 terminates in a free edge 1127. The free edge 1127 is near but not in contact with the rail. Thus, the planar wall 112, slot wall 1129 and the extended main body portion 1118 define a slot 1128. The planar wall 1122 includes at least one fastener opening configured to receive a fastener 1150 to secure the first splice plate 1116a to the second splice plate 1116b. For example, the illustrated embodiment includes two vertically spaced openings (FIG. 37).

The main body 1118 of the second splice plate 1116b terminates at an outwardly extending (i.e., in the outboard direction) first wall 1134 at the longitudinal edge of the cable tray section 1112. The first wall 1134 is generally perpendicular to the main body 1118 and extends past the vertical web 1130 of the rail. The first wall 1122 of the first splice plate 1116a includes at least one fastener opening configured to receive the fastener 1150 to secure the second splice plate 1116b to the first splice plate 1116a. The outboard edge of the first wall 1134 is joined to a second wall 1137. The second wall 1137 is generally perpendicular to the first wall 1134 and parallel to and extending away from the main body 1118. The second wall 1137 terminates at an inwardly extending (i.e., in the inboard direction) planar wall 1138, although the wall 1138 can be curved without departing from the scope of the present disclosure. The inboard edge of the wall 1138 terminates at a slot wall 1140 extending back toward the main body portion 1118 and generally parallel to the main body portion 1118 and perpendicular to the planar wall 1138. The slot wall 1140 terminates in a free edge 1142. The free edge 842 is near but not in contact with the rail. Thus, the slot wall 1140, planar wall 1138, and the second wall 1137 define a slot 1128 of the second splice plate 1116b.

During installation, the second splice plate 1116b is slid to mate with the first splice plate 1116a. That is, the slot wall 1140 of the second splice plate section is slid to rest inside the slot 1128 of the first splice plate section 816a. In this way, the slot wall 1129 of the first splice plate 1116a rests inside the slot 1128 of the second splice plate 1116b. The fastener openings of planar wall 1122 of the first splice plate 816a align with corresponding fastener openings of the first wall 1134 of the second splice plate 816b. The bottom edge of the second wall 1137 of the second splice plate section 1116b includes a stopper flange 1157 extending toward the main body portion 1118. The stopper flange 1157 prevents the slot wall 1129 of the first splice plate 1116a from sliding all the way through the slot 1128 of the second splice plate 1116b.

The bodies of the splice members defined herein may be integrally formed as a single, one-piece component. For example, the splice member can be formed from extruded aluminum or other metals, alloys, or materials (e.g., plastic) and/or formed by other methods without departing from the scope of the present disclosure.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

The invention claimed is:
1. A cable tray assembly comprising:
first and second cable tray sections having longitudinal ends, each cable tray section comprising right and left rails and a plurality of rungs extending between the right and left rails, each of the right and left rails including an upper flange, a lower flange, and a vertical web extending between the upper and lower flanges, wherein the vertical web has opposite inboard and outboard sides; and
a splice plate assembly connecting the first and second cable tray sections to one another such that longitudinal ends of the first and second cable tray sections oppose one another, the splice plate assembly including
a first right splice plate having upper and lower ends and defining upper and lower fastener openings adjacent the upper and lower ends, wherein a first right fastener is received in the vertical web of the right rail of the first cable tray section and at least one of the upper and lower fastener openings of the first right splice plate to secure the first right splice plate to the outboard side of the vertical web of the right rail of the first cable tray section adjacent the longitudinal end of the first cable tray;
a first left splice plate having upper and lower ends and defining upper and lower fastener openings adjacent the upper and lower ends, wherein a first left fastener is received in the vertical web of the left rail of the first cable tray section and at least one of the upper and lower fastener openings of the first left splice plate to secure the first left splice plate to the outboard side of the vertical web of the left rail of the first cable tray section adjacent the longitudinal end of the first cable tray;
a second right splice plate having upper and lower ends and defining upper and lower fastener openings adjacent the upper and lower ends, wherein a second right fastener is received in the vertical web of the right rail of the second cable tray section and at least one of the upper and lower fastener openings of the second right splice plate to secure the second right splice plate to the outboard side of the vertical web of the right rail of the second cable tray section adjacent the longitudinal end of the second cable tray;
a second left splice plate having upper and lower ends and defining upper and lower fastener openings adjacent the upper and lower ends, wherein a second left fastener is received in the vertical web of the left rail of the second cable tray section and at least one of the upper and lower fastener openings of the second left splice plate to secure the second left splice plate to the outboard side of the vertical web of the left rail of the second cable tray section adjacent the longitudinal end of the second cable tray;
a right splicing fastener connecting the first and second right splice plates to one another; and
a left splicing fastener connecting the first and second left splice plate to one another,
wherein each of the first right fastener, the first left fastener, the second right fastener, and the second left fastener includes a head and a shaft extending from the head,
wherein the head of the first right fastener is on the inboard side of the vertical web of the right rail of the first cable tray section, and the shaft of the first right fastener extends through the vertical web of the right rail of the first cable tray section and into the at least one of the upper and lower fastener openings of the first right splice plate,
wherein the head of the first left fastener is on the inboard side of the vertical web of the left rail of the first cable tray section, and the shaft of the first left fastener extends through the vertical web of the left rail of the first cable tray section and into the at least one of the upper and lower fastener openings of the first left splice plate,
wherein the head of the second right fastener is on the inboard side of the vertical web of the right rail of the second cable tray section, and the shaft of the second right fastener extends through the vertical web of the right rail of the second cable tray section and into the at least one of the upper and lower fastener openings of the second right splice plate,
wherein the head of the second left fastener is on the inboard side of the vertical web of the second rail of the second cable tray section, and the shaft of the second left fastener extends through the vertical web of the left rail of the second cable tray section and into the at least one of the upper and lower fastener openings of the second left splice plate, and
wherein the shafts of the first right fastener, the first left fastener, the second right fastener, and the second left fastener do not extend through corresponding outboard sides of the first right splice plate, the first left splice plate, the second right splice plate, and the second left splice plate, respectively.

2. The cable tray assembly set forth in claim 1, wherein the shafts of the first right fastener, the first left fastener, the second right fastener, and the second left fastener are threaded.

3. The cable tray assembly set forth in claim 2, the shafts of the first right fastener, the first left fastener, the second right fastener, and the second left fastener are threaded into the at least one of the upper and lower openings of the first right splice plate, the first left splice plate, and the second right splice plate, the second left splice plate, respectively.

4. The cable tray assembly set forth in claim 1, wherein the first and second right splice plates define aligned splicing openings in which the right splicing fastener is received, and wherein the first and second left splice plates define aligned splicing openings in which the left splicing fastener is received.

5. The cable tray assembly set forth in claim 4, wherein splicing openings extend along the respective first right splice plate, first left splice plate, second right splice plate, and second left splice plate.

6. A cable tray section assembly comprising:
a cable tray section having a longitudinal end, and comprising right and left rails and a plurality of rungs extending between the right and left rails, each of the right and left rails including an upper flange, a lower flange, and a vertical web extending between the upper and lower flanges, wherein the vertical web has opposite inboard and outboard sides;
a right splice plate having upper and lower ends and defining upper and lower fastener openings adjacent the upper and lower ends, wherein a right fastener is received in the vertical web of the right rail of the cable tray section and at least one of the upper and lower fastener openings of the right splice plate to secure the right splice plate to the outboard side of the vertical web of the right rail of the cable tray section adjacent the longitudinal end of the cable tray;
a left splice plate having upper and lower ends and defining upper and lower fastener openings adjacent the upper and lower ends, wherein a left fastener is received in the vertical web of the left rail of the cable tray section and at least one of the upper and lower fastener openings of the left splice plate to secure the left splice plate to the outboard side of the vertical web of the left rail of the cable tray section adjacent the longitudinal end of the cable tray;
wherein the right splice plate defines a splicing fastener opening configured to receive a right splicing fastener to secure the right splice plate to a right splice plate of a second cable tray section,
wherein the left splice plate defines a splicing fastener opening configured to receive a left splicing fastener to secure the left splice plate to a left splice plate of the second cable tray section,
wherein each of the right fastener and the left fastener includes a head and a shaft extending from the head,
wherein the head of the right fastener is on the inboard side of the vertical web of the right rail of the cable tray section, and the shaft of the right fastener extends through the vertical web of the right rail of the cable tray section and into the at least one of the upper and lower fastener openings of the right splice plate,
wherein the head of the left fastener is on the inboard side of the vertical web of the left rail of the cable tray section, and the shaft of the left fastener extends through the vertical web of the rail of the cable tray section and into the at least one of the upper and lower fastener openings of the left splice plate, and
wherein the shafts of the right fastener and the left fastener do not extend through corresponding outboard sides of the right splice plate and the left splice plate, respectively.

7. The cable tray section assembly set forth in claim 6, wherein the shafts of the right and left fasteners are threaded.

8. The cable tray section assembly set forth in claim 7, the shafts of right and left fasteners are threaded into the at least one of the upper and lower openings of the right and left splice plates, respectively.

9. The cable tray section assembly set forth in claim 6, wherein the splicing openings extend along the respective right and left splice plates.

10. A splice plate for using in splicing together two cable tray sections, the splice plate comprising:
a splice body having upper and lower ends, opposite longitudinal ends, and opposite inboard and outboard sides, the splice body being sized and shaped to be received between upper and lower outboard flanges of a rail of a cable tray section, wherein the splice body defines upper and lower fastener openings each extending laterally through the inboard side of the splice body and terminating in the splice body such that each of the upper and lower fastener openings do not extend through the outboard side of the splice body, and wherein each of the upper and lower fastener openings is configured to receive fastener to attach the splice plate to the rail of the cable tray section.

11. The splice plate set forth in claim 10, wherein the splice body defines a splicing fastener opening configured to receive a splicing fastener to connect the splice plate to another splice plate.

12. The splice plate set forth in claim 11, wherein the splicing fastener opening has a rectangular cross-sectional shape.

* * * * *